US007912769B2

(12) United States Patent
Ostergard

(10) Patent No.: US 7,912,769 B2
(45) Date of Patent: *Mar. 22, 2011

(54) SHAREHOLDER VALUE TOOL

(75) Inventor: Michael Kirk Ostergard, Marietta, GA (US)

(73) Assignee: Accenture Global Services Limited, Dublin (IE)

(*) Notice: Subject to any disclaimer, the term of this patent is extended or adjusted under 35 U.S.C. 154(b) by 1000 days.

This patent is subject to a terminal disclaimer.

(21) Appl. No.: 10/903,488

(22) Filed: Aug. 2, 2004

(65) Prior Publication Data

US 2005/0273404 A1 Dec. 8, 2005

Related U.S. Application Data

(63) Continuation-in-part of application No. 10/609,690, filed on Jul. 1, 2003.

(51) Int. Cl.
*G06Q 40/00* (2006.01)
(52) U.S. Cl. .......... 705/35; 705/38; 705/36 R; 705/36 T
(58) Field of Classification Search .................. None
See application file for complete search history.

(56) References Cited

U.S. PATENT DOCUMENTS

| | | | | | |
|---|---|---|---|---|---|
| 5,132,899 | A | * | 7/1992 | Fox | 705/36 R |
| 5,946,667 | A | * | 8/1999 | Tull et al. | 705/36 R |
| 6,321,205 | B1 | * | 11/2001 | Eder | 705/7 |
| 6,393,406 | B1 | * | 5/2002 | Eder | 705/7 |
| 6,411,936 | B1 | * | 6/2002 | Sanders | 705/10 |
| 6,832,211 | B1 | * | 12/2004 | Thomas et al. | 705/35 |
| 6,850,897 | B2 | * | 2/2005 | Paquette | 705/36 R |
| 7,308,427 | B1 | * | 12/2007 | Hood | 705/35 |
| 2001/0034686 | A1 | * | 10/2001 | Eder | 705/36 |
| 2002/0042751 | A1 | * | 4/2002 | Sarno | 705/26 |
| 2002/0169658 | A1 | * | 11/2002 | Adler | 705/10 |
| 2002/0173998 | A1 | * | 11/2002 | Case | 705/7 |
| 2003/0046203 | A1 | * | 3/2003 | Ichihari et al. | 705/35 |
| 2003/0120577 | A1 | * | 6/2003 | Sakui et al. | 705/36 |
| 2003/0172014 | A1 | * | 9/2003 | Quackenbush et al. | 705/35 |
| 2003/0212621 | A1 | * | 11/2003 | Poulter et al. | 705/36 |
| 2004/0024674 | A1 | * | 2/2004 | Feldman | 705/36 |
| 2004/0039619 | A1 | * | 2/2004 | Zarb | 705/7 |
| 2004/0039676 | A1 | * | 2/2004 | Trainer | 705/36 |
| 2004/0177016 | A1 | * | 9/2004 | Jones et al. | 705/35 |

(Continued)

OTHER PUBLICATIONS

"The market value of debt, market versus book value of debt, and returns of assets—includes appendices"; Financial Management (Financial Management Association), Spring, 1997 by Richard J. Sweeney (pp. 1-2).*

(Continued)

*Primary Examiner* — Alexander Kalinowski
*Assistant Examiner* — Gregory Johnson
(74) *Attorney, Agent, or Firm* — Finnegan, Henderson, Farabow, Garrett & Dunner, LLP

(57) ABSTRACT

The present invention provides and system and related method for automatically examining a company's financial data and evaluating factors affecting the company's stock value. Specifically, the present invention evaluates a company's spread through that company's debt and equity costs. The present invention further measures returns to investors from company growth, either organic growth or growth through Mergers and acquisitions. The present invention may further evaluate the financial data of other publicly traded companies, such as those in the same industry, and compares the various factors affecting stock value. Proposed actions may then be evaluated according to their predicted changes to accounting values and the resulting changes in shareholder value from these changes.

38 Claims, 14 Drawing Sheets

U.S. PATENT DOCUMENTS

| | | | | |
|---|---|---|---|---|
| 2004/0236658 | A1* | 11/2004 | Bowman | 705/36 |
| 2005/0004854 | A1* | 1/2005 | Jones et al. | 705/35 |
| 2005/0144106 | A1* | 6/2005 | Eder | 705/36 |
| 2005/0262014 | A1* | 11/2005 | Fickes | 705/38 |
| 2008/0004922 | A1* | 1/2008 | Eder | 705/7 |
| 2008/0027769 | A1* | 1/2008 | Eder | 705/7 |
| 2008/0071588 | A1* | 3/2008 | Eder | 705/7 |

OTHER PUBLICATIONS

Medtronic's chairman William George on how mission-driven companies create long-term shareholder value; William W George; The Academy of Management Executive; Nov. 2001; 15, 4; 9 pages.*

A value-based analysis of specialty chemical companies; David Begleiter; Chemical Market Reporter; May 28, 2001; 259, 22; 3 pages.*

Shareholder Value, Stakeholder Management, and Social Issues: What's the Bottom Line?; Amy J. Hillman and Gerald D. Keim; Ivey School of Business, University of Western Ontario, London, Ontario, Canada; Strategic Management Journal; Strat. Mgmt. J., 22: 125-139 (2001); 15-pages.*

Successful growth models for the chemical industry: New models set a future course; John Aalbregtse and David Davies; Chemical Market Reporter; New York: Jun. 3, 2002. vol. 261, Iss. 22; 8-pages.*

The Relationship between Growth, Profitability, and Firm Value; Nikhil Varaiya, Roger A. Kerin and David Weeks; Strategic Management Journal, vol. 8, No. 5 (Sep.-Oct. 1987); 12-pages.*

Environmental Shareholder Value: Economic Success With Corporate Environmental Management; Stefan Schaltegger and Frank Figge; Eco-Management and Auditing; Eco-Mgmt. Aud. 7, 29-42 (2000); 14-pages.*

* cited by examiner

A Process for Developing a
Target Capital Structure
600

Shareholder Tool Analysis Method 1400

SHAREHOLDER VALUE TOOL

CROSS-REFERENCE TO RELATED APPLICATIONS

This application claims is a continuation-in-part to pending U.S. patent application Ser. No. 10/609,690, entitled "Shareholder Value Tool" filed on Jul. 1, 2003, the subject matter of which is incorporated by reference in full.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

Field of the Invention

The present invention relates to computerized system that automatically analyzes an organization's financial data to evaluate various factors influences that organization's stock value. The present invention may further an organization's identify areas of need and may assess actions according to projected improvements in shareholder value.

In turbulent financial conditions, it is often difficult to accurately value a publicly traded stock asset. Similarly, it is difficult to examine the stock prices for two companies and determine the causes for the differences or similarities in the stock prices.

As displayed in Tables 1-4, there are numerous known financial measurements that can be used to evaluate a company's financial performance and health.

TABLE 1

Liquidity Ratios

| RATIO | FORMULA | PURPOSE OR USE |
|---|---|---|
| Current ratio | $\dfrac{\text{Current Assets}}{\text{Current Liabilities}}$ | Measures short-term debt-paying ability |
| Quick or acid-test ratio | $\dfrac{\text{Cash, marketable securities, and receivables (net)}}{\text{Current Liabilities}}$ | Measures immediate short-term liquidity |
| Current cash debt average ratio | $\dfrac{\text{Net cash provided by operating activities}}{\text{average current liabilities}}$ | Measures a company's ability to pay off its current liabilities in a given year out of its operations |

TABLE 2

Activity Ratios

| Receivable Turnover | $\dfrac{\text{Net Sales}}{\text{Average trade receivables (net)}}$ | Measures liquidity of receivables |
|---|---|---|
| Inventory Turnover | $\dfrac{\text{Cost of goods sold}}{\text{average inventory}}$ | Measures overall profitability of assets |
| Asset Turnover | $\dfrac{\text{Net Sales}}{\text{Average Total Assets}}$ | Measures how efficiently assets are used to generate sales |

TABLE 3

Profitability Ratios

| Profit margin on sales | $\dfrac{\text{Net income}}{\text{Net sales}}$ | Measures net income generated by each dollar of sales |
|---|---|---|
| Rate of return on assets | $\dfrac{\text{Net income}}{\text{Average total assets}}$ | Measures overall profitability of assets |
| Rate of return on common stock equity | $\dfrac{\text{Net income minus preferred dividends}}{\text{Average common stockholders' equity}}$ | Measures profitability of owners' investment |
| Earnings per share | $\dfrac{\text{Net income minus preferred dividends}}{\text{weighted shares outstanding}}$ | Measures net income earned on each share of common stock |
| Price earnings ratio | $\dfrac{\text{Market Price of Stock}}{\text{Earnings per share}}$ | Measures the ratio of the market price per share to earnings per share |
| Payout ratio | $\dfrac{\text{Cash Dividends}}{\text{Net Income}}$ | Measures percentage of earnings distributed in the form of cash dividends |

TABLE 4

Coverage Ratios

| Debt to Total Assets | $\dfrac{\text{Total Debt}}{\text{Total Assets or Equities}}$ | Measures the percentage of total assets provided by creditors |
|---|---|---|
| Times Interest Earned | $\dfrac{\text{Income before interest charges and taxes}}{\text{interest charges}}$ | Measures ability to meet interest payments as they come due |
| Cash debt coverage ratio | $\dfrac{\text{Net cash provided by operating activities}}{\text{Average total liabilities}}$ | Measures a company's ability to repay its total liabilities in a given year out of its operations |
| Book Value per Share | $\dfrac{\text{Common Stockholders' Equity}}{\text{Outstanding Shares}}$ | Measures the amount each share would receive if the company were liquidated |

Of these measures, two metrics commonly used to measure a company's performance are Return on Equity (as defined in Equation 1) and Return on Assets (as defined in Equation 2). However, as described below, results from these metrics are frequently misleading.

$$\text{Return on Equity} = \frac{\text{Net Income}}{\text{Shareholders Equity}} \quad \text{(Eq. 1)}$$

$$\text{Return On Assets} = \frac{\text{Net Income}}{\text{Assets}} \quad \text{(Eq. 2)}$$

However, it is often difficult to make meaningful comparisons of companies when using the above-described metrics in Tables 1-4, such as Returns on Assets and Equity, because of limitations in Generally Accepted Accounting Principles (GAAP) and international differences in accounting practices. For instance, Net Income, as used in Equations 1 and 2, is highly dependent on the accounting quality of earning measurements in that Net Income tries to capture non-operating income and expense and is, therefore, subject to companies attempting to manage earnings reports. There is also a wide disparity in the calculation of Net Income from one country to another. Furthermore, Net Income may be misleading because companies that have been highly acquisitive tend to have higher non-cash charges (e.g., amortization) that artificially result in lower new income. In the same way, the Assets and Equity values used in Equations 1 and 2 may vary because of international differences that create a wide disparity in how assets are recorded from country to country. Also, the Assets and Equity quantities may be misleading because of accounting anomalies, such as an acquisition in which a seller may sell fully depreciated assets [thereby having no accounting value to the seller] but a buyer may record assets equal to fair value at the time of purchase [thereby being a positive value in the buyer's accounting]. Similar problems also exist with the other known measures of business performance because of GAAP limitations and international differences in accounting practices.

To assist the public in valuing a company and thus valuing that company's stock, publicly traded companies may be legally required to provide various accounting and financial disclosures. For instance, most publicly traded companies in the United States are required to submit financial disclosure data to the United States Securities and Exchange Committee, which publishes this information online to the public. Specifically, the SEC requires all publicly traded companies (except certain foreign companies and companies with less than $10 million in assets and fewer than 500 shareholders) to file registration statements, periodic reports, and other forms electronically through the Electronic Data Gathering, Analysis and Retrieval (EDGAR) database. Anyone can access and download this information for free. For more information on EDGAR, please refer to http://www.sec.gov/edgar.shtml.

However, since statutes and regulations require a large number of filings from a large number of entities, the EDGAR database has grown to enormous proportions. As a result of the size of the EDGAR database and as a consequence of inconsistencies with respect to how different entities report similar matters, it is inherently difficult to analyze the EDGAR data in a meaningful way. Basic text searches can be performed, but meaningful data reduction is substantially hampered by inconsistencies and by the variety of reporting forms used to report similar information.

Financial data on many publicly traded companies is also available for a fee through commercial services such as Standard and Poor's Compustat® database at www.Compustat.com or Thomson Financial's Global Access® database at www.Primark.com. Many companies also publicly disclose various financial data to potential investors. However, as with the information on the EDGAR website, this information is difficult to comprehend without processing that requires a high level of skill and is typically time consuming, expensive, and labor intensive.

Much like investors, a company often faces difficulty and expense in analyzing its own stock performance. From the standpoint of businesses, it is also helpful to analyze stock performance to determine various value drivers (e.g., net sales, gross sales, profitability, market share, research and development expenditures, labor force size, cash holdings, fixed costs, debt load, manufacturing capacity, assets allocation, etc.) affecting stock values. By analyzing the performance of its stock and comparing this performance to the stock performance of competing businesses, a company may form a course of action that fosters value drivers that benefit stock value while minimizing the effect of value drivers deflating stock values.

SUMMARY OF THE INVENTION

In response to these and other needs, the present invention provides and system and related method for automatically examining a company's financial data and evaluating factors affecting the company's stock value. Specifically, the present invention evaluates a company's spread through that company's debt and equity costs. The present invention further measures returns to investors from company growth, either organic growth or growth through mergers and acquisitions.

In a preferred embodiment, the present invention further evaluates the financial data of other publicly traded companies, such as those in the same industry, and compares the various factors affecting stock value.

In another embodiment, the present invention includes a system for determining the return to investors. In one embodiment, the system is a software-based application that collects or receives financial data and uses this information to calculate the return to inventors through the company's spread and growth. In a particular implementation, the system is connected to a distributed network such as the Internet to automatically receive data and to use this data in calculating the return to investors.

At times, an organization's shareholder return is known and various unknown accounting values may be deduced using various calculations used to calculate shareholder value.

In other embodiments, the present invention provides a system were publicly-available financial data is collected and combined with private data at a local data storage device. The locally stored data may then be manipulated as needed to perform desired calculation and measurements.

In particular, the locally stored data may be manipulated to reflect business changes and to predict the impact to shareholder return from these changes. These changes may be abstract changes to accounting values, such as changes in various costs, tax, or price values. In this way, the present invention may be used to evaluate the relative importance of these accounting values in the calculation of shareholder return for a particular organization, and similarly, the relative ability of the various accounting values to change shareholder return. For example, the present invention may calculate the sensitivity of shareholder return to various changes to the accounting value (e.g., the accounting value adjust by plus or minus a predefined constant value and the result to shareholder return from these changes). The sensitivity of the shareholder return to the various accounting values provides important insight into an organization's performance and needs. Where an organization's shareholder return is particularly sensitive to changes in an accounting value, this suggests that the organization is underperforming in areas related to that accounting value. In a similar way, the sensitivity analysis may be repeated for several organizations, and the performance of the organizations may compared according to the relative sensitivities of these organization's shareholder return to changes in a shared accounting value.

Alternatively, the changes to one or more accounting values may be used to model the results from business changes. For example, the relative sensitivity of shareholder return to changes in the accounting values impacted by the proposed business action may be used to predict the actual impact of the business action. Similarly, the shareholder return may be calculated with and without the predicted changes to the accounting values caused by the proposed business action. The business action may then be evaluated according to its predicted changes to overall shareholder return.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein.

DETAILED DESCRIPTION OF THE PREFERRED EMBODIMENTS

Figure 1:
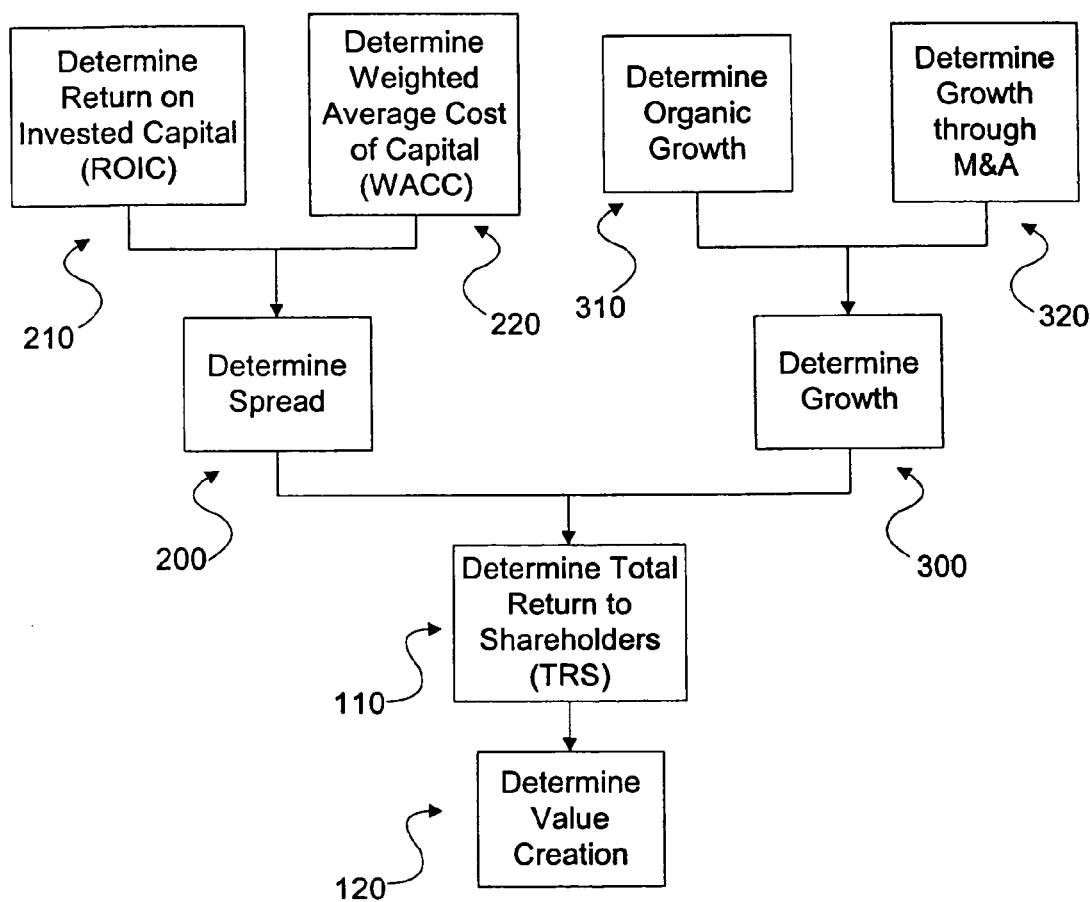
FIG. 1 illustrates a shareholder value calculation method in accordance with embodiments of the present invention.

As depicted in FIG. 1., the present invention provides a shareholder value calculation method 100 for automatically evaluating various factors contributing to the value of a company's publicly traded stock. Shareholder value creation determined in step 120 is computed using a total return to shareholders (TRS) calculated in step 110, which is driven by both spread and growth, as determined in steps 200 and 300, respectively. The steps in the shareholder value calculation method 100 are described in greater detail below.

The various calculations in the shareholder value calculation method 100 generally look to information in a company's financial statement. Financial statements generally consist of a balance sheet, income statement, cash flow statement, and notes to the financial statements. Core Financial Statements contents include: Balance Sheet; Income Statement; Cash Flow Statement; and Notes to the Financial Statements.

Figure 2:
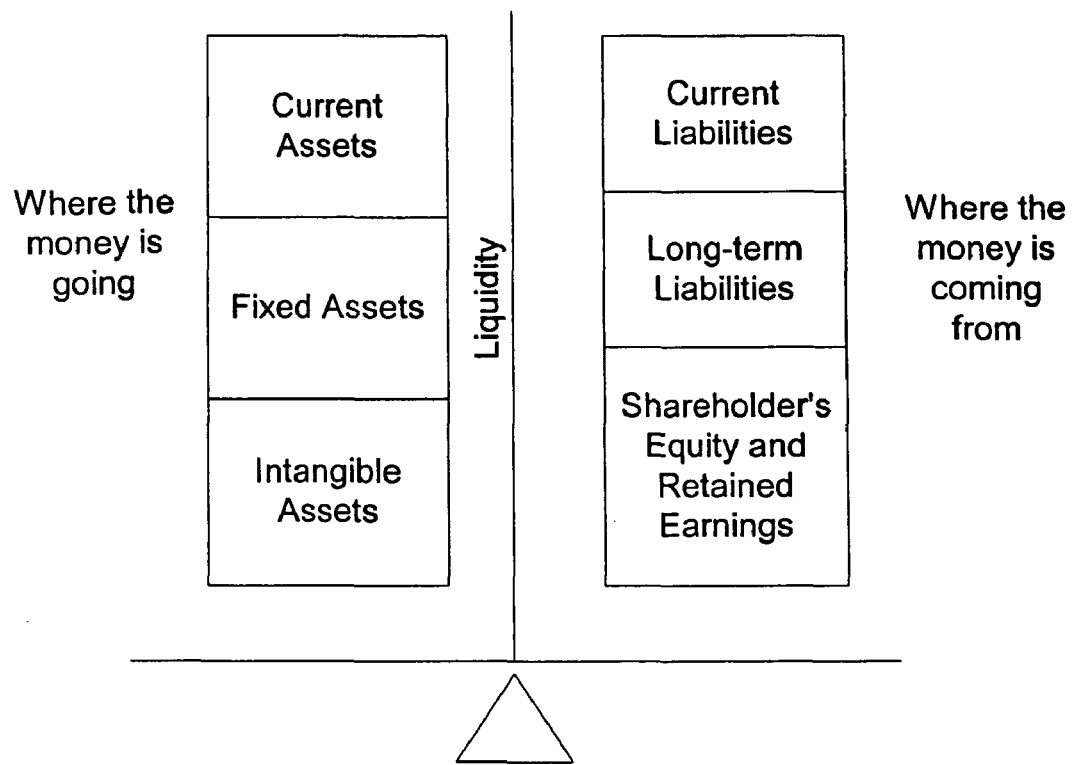
FIGS. 2-3 and 13 depict various aspects of a company's financial statement, as used in the shareholder value calculation method of FIG. 1.

A Balance Sheet is a snapshot at one point in time in the life of a business. The balance sheet represents the financial state 10 of the company at that point in time, as graphically depicted in FIG. 2. The left side of the financial state 10 represents the company's various assets, including:

Current Assets such as Cash, Short-term investments (debt and equity securities), Accounts receivable, Inventory, and Prepaid accounts;

Long-term Investments including debt and equity securities, and Investments in non-consolidated subsidiaries;

Property, Plant & Equipment such as Land, Machinery & Equipment, Furniture & Fixtures, and Accumulated depreciation; and Intangibles assets such as Patents, Goodwill, Franchises, and Trademarks.

Conversely, the rights side of the financial state 10 represents the company's various liabilities, including Current Liabilities such as Accounts payable, Deferred revenues, Current-portion of long-term debt, and Income taxes payable;

Long-term Liabilities including Pension liabilities, Bonds payable, Notes payable, Deferred tax liability; and Shareholders' Equity including Common stock (at par), Additional paid-in capital, Preferred stock, and Retained earnings.

Figure 3:
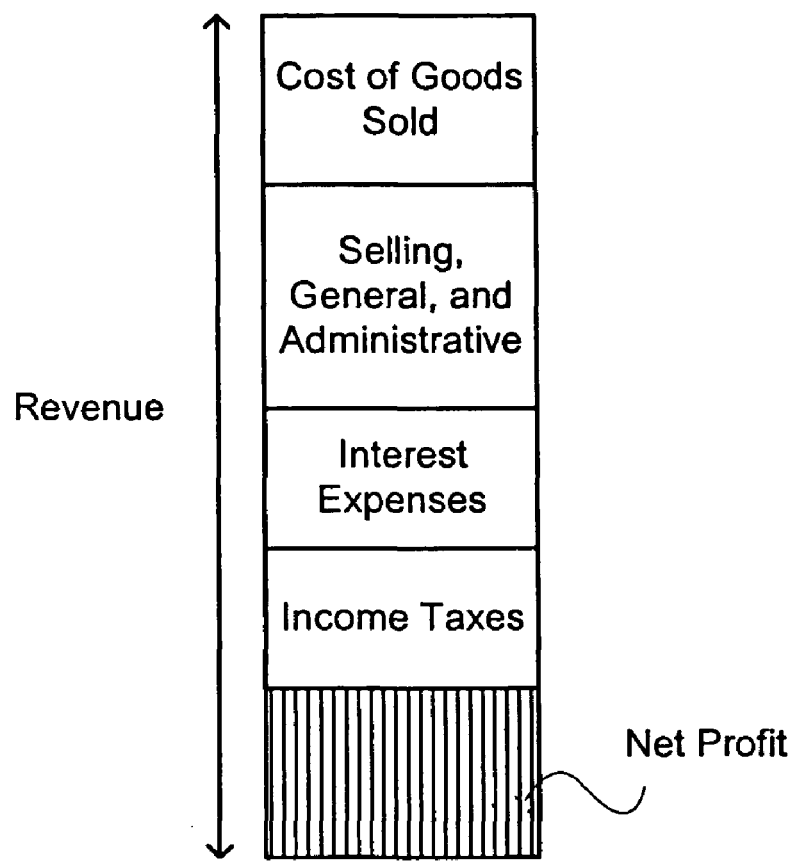

Continuing with the financial statement, it generally includes an income statement (graphically depicted as income statement 20 in FIG. 3) that shows the income generated and the costs incurred over a period of time, such as a financial year. As depicted in FIG. 3, aspects of the income statement 20 include:

Cash and credit sales;

the Cost of Goods Sold including costs for raw materials, Direct labor, Factory overhead (including production depreciation),and Freight-in;

Selling, General, and Administrative costs such as Non-production salaries (marketing, sales, accounting, etc.), and Amortization;

Miscellaneous costs such as freight-out, Advertising/marketing expenses, and Non-production depreciation;

Non-operating expenses including Income/Expense and Gain/loss associated with sale of assets other than inventory Gains/losses associated with non-operating activities;

Interest Expenses such as Interest on debt payable and Interest on capital lease obligations; and Income Tax Expense including deferred tax expense and Income tax expense.

Another aspect of the company's financial statement is a Cashflow Statement (not illustrated) that is simply a statement of all the cash received or paid during the year. The Cashflow Statement includes various data including:

Changes in Cash and Cash Equivalents for the Period describing Cash Flows from Operating Activities, Investing Activities, and Financing Activities adjusted for Cash Outflows;

Net cash provided by operating activities such as Net income, Depreciation and amortization, Deferred income taxes, Equity income or loss, net of dividends, Foreign currency adjustments, Gains on sales of assets, and Net change in operating assets and liabilities;

Net cash used in investing activities such as Acquisitions and investments, purchases of investments and other assets, proceeds from disposals of investments and other assets, Purchases of property, plant and equipment, and Proceeds from disposals of property, plant and equipment;

Financing Activities such as Issuances of debt, Payments of debt, Issuances of stock, Purchases of stock for treasury, and Dividends;

The Effect of Exchange Rate Changes on Cash and Cash Equivalents; and

Cash and Cash Equivalents Balance at end of year, specifically, Net increase (decrease) during the year, and Balance at beginning of the year.

Another integral part of the company's financial statement is a section of Notes to the Accounts where all the small print is found. The Notes to the Accounts contain valuable information on the following:

Accounting conventions used;

Fair value of assets (marketable securities, fixed assets, equity investments, intangible assets);

Details of liabilities (type and term of debt);

Segment data (geographic, product, divisional);

Details of shares and new issuance;

Details of pension liabilities;

Details of Employee Stock Option Plans (ESOP's); and

Off-balance sheet liabilities (leases, derivatives).

Returning now to FIG. 1, the shareholder value calculation method 100 includes the steps of calculating spread in step 200 and the calculation of growth in step 300. The calculation of spread in step 200 addresses value through the business operations of the company whereas the calculation of growth in step 300 addresses changes in the value of the company through changes in its size and structure.

ROIC

As depicted in FIG. 1, the determination of spread in step 200 includes the calculation of a return on invested capital (ROIC) in step 210 and a weighted average cost of capital (WACC) in step 220. The ROIC value captures the return on the investment provided by the company's investors (debt and equity investors). ROIC is defined in Eq. 3:

$$ROIC = \frac{NOPLAT}{\text{Invested Capital}} \quad \text{(Eq. 3)}$$

In Equation 3, Invested Capital represents capital provided by debt and equity investors. Invested capital is money invested to derive a company's operating profits. Continuing with Equation 3, net operating profit less adjusted taxes (NOPLAT) is the total operating profits for a business with adjustments made for taxes. Thus, NOPLAT measures the total cash available for distribution to financial capital contributors.

The company's invested capital is needed to determine ROIC in step 210 using Equation 3. In theory, debt and equity investors are the only group that demands a return from the company's operations. The debt investor invests capital as reflected by the amount of a note. The amount owed to debt investors is reflected on a company's balance sheet as the current maturities of long-term debt, long-term debt, and capitalized leases. The debt investor has an expected return of interest on the outstanding obligation of the company. An equity investor may provide an initial investment that appears on a company's balance sheet as common stock, additional paid-in-capital, or as preferred stock. Conversely, an equity investor may provide earnings from an initial investment to be reinvested in operations, and these reinvested earnings appear on a company's balance sheet as retained earnings. In exchange for the initial investment and the reinvested earnings, the equity investor expects to receive capital appreciation plus dividends.

Invested capital may be determined using Equation 4A or 4B:

Invested Capital≈Working Capital+Fixed Assets    (Eq. 4A), or

Invested Capital≈Debt+Equity    (Eq. 4B)

where working capital equals current assets minus current liabilities.

The calculation of invested capital preferably includes a consideration of "quasi-debt" and "quasi-equity." The term quasi-debt is used herein to refer to money that a company has borrowed to fund retirement-related liabilities, and the quasi-debt effects investors' interests because of the negative future returns associated with the cost of the debt. The quasi-debt is generally included in "other long-term liabilities" or another similar entry in a company's balance sheet. The term quasi-equity, as used herein, refers to deferred income taxes. The quasi-equity should be included in the calculation of invested capital because it may produce a return to shareholders in the form of capital.

To calculate invested capital using either Equations 4A or 4B, the company's balance sheet may be organized to see how much capital is invested in the company by equity and debt investors and how much of the capital has been invested in operating activities and other non-operating activities. Invested capital may thus be calculated in two ways—either identifying where the capital is invested (essentially Working Capital+Fixed Assets) or identifying the sources for the capital (essentially Equity+Debt+other).

More specifically, the identifying of where the capital is invested begins by determining net operating working capital. The determining of net operating working capital generally includes calculating the difference between operating current assets and operating current liabilities. The operating working capital is added to (1) net property, plant and equipment and (2) other assets net of other liabilities to calculate operating invested capital. Then, the operating invested capital may be summed together with goodwill and cumulative goodwill written off (which is typically not available from publicly available data) to calculate operating invested capital after goodwill. The operating invested capital after goodwill is then added to excess marketable securities and non-operating assets to calculate total investor funds.

Alternatively, invested capital may be calculated by identifying the sources for the capital. Specifically, adjusted equity is calculated by adding equity, cumulative written off goodwill, and deferred income taxes (i.e., quasi assets). The adjusted equity is then summed with debt and retirement related liabilities (i.e., quasi debt) to calculate total investor funds. It should be appreciated that the amount of invested capital determined through either identifying of where the capital is invested identifying the sources for the capital should be the same.

Referring back to Equation 3, the next task in determining the ROIC in step 210 is to calculate a company's NOPLAT. As described above, NOPLAT represents the residual return earned by the debt and equity holders after other stakeholders are paid in the operation of the business. Generally, NOPLAT may be calculated using Equation 5, NOPLAT=EBITA−Cash Taxes    (EQ. 5)

where EBITA (Earnings Before Interest, Taxes, and Amortization) is typically calculated by looking to the company's revenue, adjusted for the cost of goods/services (such as wages and material costs associated with producing the good/service and any depression) and other expenses including selling, general, and administrative costs (such as other wages, commissions, and fees).

Continuing with Equation 5, the next task in calculating NOPLAT is to calculate the cash taxes paid on the EBITA. Generally, the cash taxes are calculated using GAAP income taxes adjusted for reverse deferred taxes. The reverse deferred taxes represents tax liabilities that are recognized for accounting purposes, but not for tax purposes. The cash taxes may be further adjusted for any lost interest expense deduction to determine the cash taxes on the EBITA.

After determining EBITA and Cash Taxes on the EBITA, NOPLAT may then calculated by subtracting the cash taxes on EBITA from EBITA.

As with invented capital, NOPLAT may be determined in two ways, either adjusting from revenues ("top down") or adding back to net income ("bottom up"). Either method may be used and both may be done to ensure that the calculations of NOPLAT are performed correctly. Thus, in the top down method, $$NOPLAT = \text{Reported } EBITA - \text{Taxes on } EBITA + \text{Increase in Deferred Taxes} \quad (Eq.\ 6)$$

where the reported EBITA is the total revenues adjusted for the Cost of goods sold; selling, general and administration expenses; depreciation expense; and other operating expenses. In the top down method, a company's Net Income is summed with any increases in deferred taxes, goodwill amortization, any extraordinary accounting items (also called special items after taxes or after tax items), and minority interest income to calculate an Adjusted Net Income for that company. Then, the Adjusted Net Income is summed with any interest expenses after tax to determine the company's Total Income Available to Investors. NOPLAT may then be calculated by subtracting Interest income after-tax and Non-operating income after-tax from the Total Income Available to Investors.

After calculating NOPLAT and Invested Capital, the ROIC may be calculated as the ratio of NOPLAT to Invested Capital, as provided above in Equation 3. Thus, using the methods described above for calculating NOPLAT, a company's ROIC for a time period of interest may be calculated using the invested capital at the end of that period or by using the average invested capital during that period.

It should be appreciated that ROIC can be disaggregated into smaller components that provide more insight into the performance of the asset under review. This disaggregation process can continue to levels with more and more actionable components. For instance, by substituting Equation 6 into Equation 3, ROIC may be redefined as suggested Equation 7.

$$ROIC = \frac{EBITA}{\text{Invested Capital}}(1 - \text{cash tax rate}) \quad (Eq.\ 7)$$

ROIC may be further decomposed through simple manipulation of Equation 7 using the algebraic equality contained in Equation 8:.

$$\frac{EBITA}{\text{Invested Capital}} = \frac{EBITA}{\text{Revenue}} \times \frac{\text{Revenue}}{\text{Invested Capital}} \quad (Eq.\ 8)$$

Equation 8 may be substituted into Equation 7 to produce Equation 7':

$$ROIC = \left(\frac{EBITA}{\text{Revenue}} \times \frac{\text{Revenue}}{\text{Invested Capital}}\right) \times (1 - \text{cash tax rate}) \quad (Eq.\ 7')$$

In Equation 7', the ratio of EBITA to Revenue represents a company's operating margin and the ratio of Revenue to Invested Capital represents that company's capital utilization.

Figure 4:
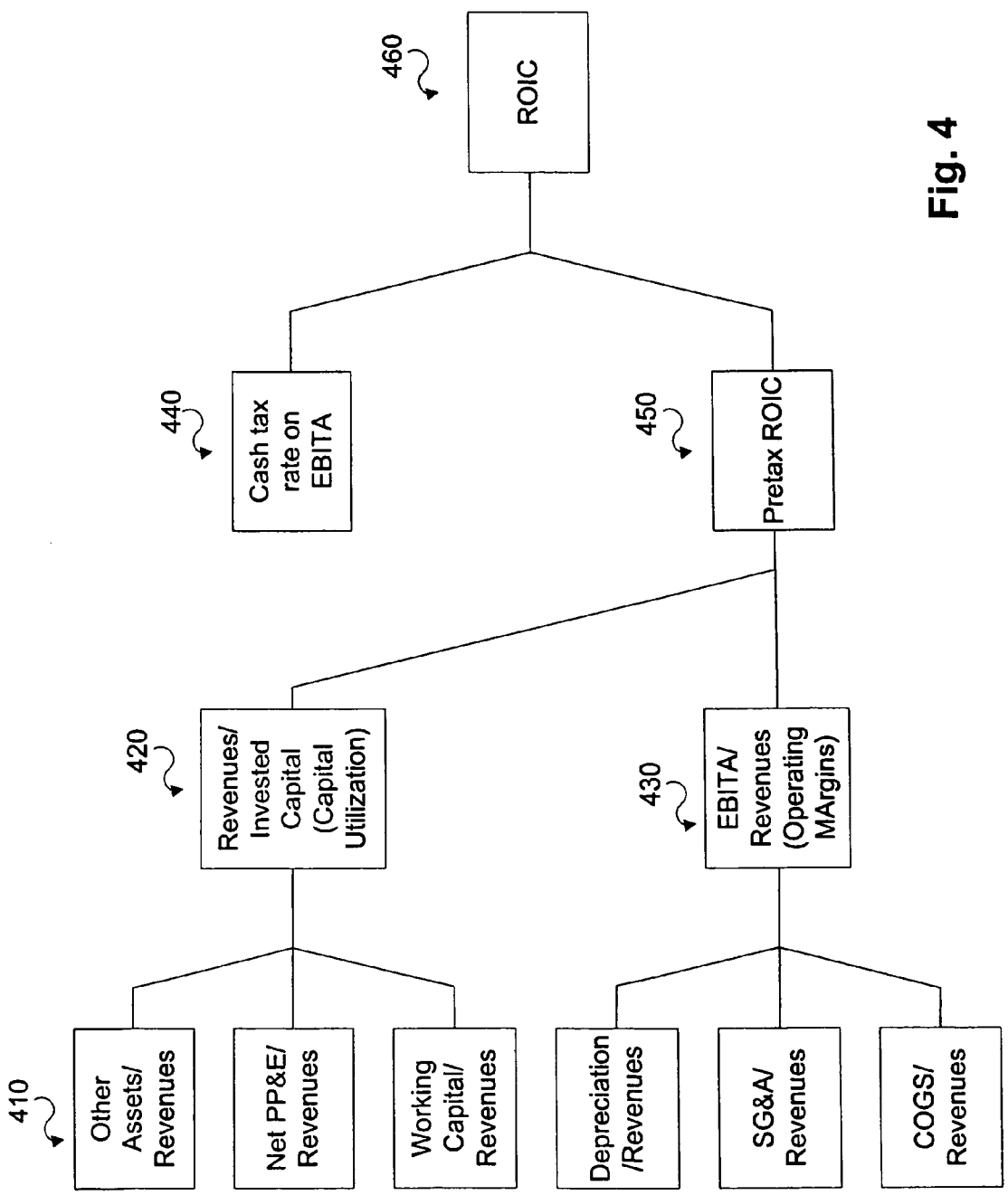
FIGS. 4-7 depict substeps in the shareholder value calculation method of FIG. 1 in accordance with embodiments of the present invention.

As depicted in FIG. 4, the component values used to calculate ROIC may be visually displayed in a tree format to gain insight concerning a company's value levers. Specifically, FIG. 4 depicts various inputs 410 that may be used to calculate operating margin 420 and capital utilization 430. The operating margin 420 and capital utilization 430 are then summed to determine pretax ROIC 440, which is adjusted by a tax rate on EBITA 450 to calculate actual ROIC 460.

WACC

Returning now to FIG. 1, the calculation of the company's Spread in step 200 continues with the calculation of the Weighted Average Cost of Capital (WACC) in step 220. The WACC of an asset represents the opportunity cost of investors for putting their money into the asset. It is the sum of the cost of debt holders and the cost of equity holders, each weighted by their share of the overall value of the asset. Thus, WACC may be calculated using Equation 9:

$$WACC = \text{weighted cost of debt} + \text{weighted cost of equity} \quad (Eq.\ 9)$$

The weighted cost of debt (WCD) in Equation 9 may be calculated using Equation 10:

$$WCD = K_d*(1-t)*D/(D+E) \quad (Eq.\ 10)$$

where $K_d$ is the cost of debt,
t is the tax rate on the debt,
D is the market value of the debt, and
E is the market value of the equity.

In Equation 10, the product of $K_d$ and (1−t) represents the after tax cost for the debt, and the ratio of the market value of the debt to the cost of the total debt and equity [D/(D+E)] represents the weighting factor for the debt. In the same way, the weighted cost for equity (WCE) may be calculated using Equation 11:

$$WCE = K_e*E/(D+E) \quad (Eq.\ 11)$$

where $K_e$ is the cost of equity, and the ratio of the market value of the equity to the market value of the total debt and equity [E/(D+E)] is the weighting factor for the equity.

In most cases, the cost of capital for debt ($K_d$) is simply the yield to maturity of the bond at current market prices, adjusted for taxes, and $K_d$ is by definition the marginal rate for a specific time period. The actual marginal rates for each time period may be hard to determine, so the cost of debt $K_d$ may be estimated by the company's yield to maturity on long-term debt, such as the cost for 5 to 10 year debt. This type of information is readily available for most publicly traded companies. Similarly, the tax rate t, representing current or expected marginal tax rate for the debt holder, may be estimated using the company's current or expected marginal tax rate, which may be easily estimated or calculated using publicly available information.

In the absence of publicly traded debt, the cost of debt $K_d$ can be determined by using the company's credit ratings. For instance, the cost of debt can be estimated by approximating a credit rating based on financial ratios such as debt/capital and times interest earned.

The other portion of WACC, the cost of equity $K_e$, may be calculated using the capital asset pricing model (CAPM). The capital asset pricing model postulates that the investors set their opportunity cost of capital equal to the returns on risk-free securities, plus a premium for the systematic risk of the individual stock. In particular, the cost of equity $K_e$ may be calculated as provided in Equation 12:

$$K_e = r_f + (r_m - r_f) * \beta \quad \text{(Eq. 12)}$$

where $K_e$ is the opportunity cost of capital for investors in this asset;

$r_f$ is the risk-free rate of return available to all investors;

$r_m$ is the historic market risk premium required to compensate investors for the additional risks associated with equity ownership; and $\beta$ is the factor by which a given stock's returns differ from the returns of the market portfolio.

The CAPM says that there is a linear relationship between the cost of equity and the riskiness of the assets, as represented by the $\beta$ value. The $\beta$ value is the standardized measure for co-variance of stock returns with aggregate market return. A stock having a high $\beta$ value tends to have exaggerated responses to moves by the market, while a low $\beta$ stock tends to have muted responses.

The risk-free rate $(r_f)$ represents the yield-to-maturity on long-term government bonds. For each year's cash flow, $r_f$ is the return on riskless assets of corresponding duration. Thus, $r_f$ may be difficult to determine since each year's cash flow has a different discount rate. The risk-free rate yield may be estimated using the maturity on long-term government bonds (in currency of cash flows) for all years of interest. If using the maturity on long-term government bonds during the years of interest causes a material impact due to an undesirably steep yield curve or an unusual cash flow pattern, separate discount rates for each year may be used in the alternative.

Continuing with Equation 12, the market risk premium $(r_m)$ may be determined by the forward-looking expected market premium, as tailored to local markets. However, $r_m$ is an area of intense debate between academics, bankers and consultants. Estimates for $r_m$ may vary greatly depending, for instance, on the mean used, the time period examined, and whether $r_m$ is evaluated backwards or forwards. For simplicity, $r_m$ may be estimating as 5% for all developed markets. This estimate for $r_m$ corresponds with historical average returns.

Continuing with Equation 12, the $\beta$ value for a publicly traded company, a private company, or a business group is a forwarding looking $\beta$ value reflecting company-specific volatility. Thus, predicted $\beta$ values are generally preferred over historical $\beta$ values, but $\beta$ calculations from different sources can vary significantly. In particular, a $\beta$ value for a publicly traded company is available through various resources. For instance, Barra®, Inc. of Berkeley, Calif. publishes a listing of $\beta$ values for companies in various industries, and this listing may be used to define a $\beta$ value for the company as described above. The $\beta$ values published by BARRA are calculated using the past price behavior of the stock and market over the past five years and are calculated relative to the local portion of the Financial Time Actuaries World Index. For more information, please see www.Barra.com. Other organizations publishing $\beta$ values for publicly traded companies include Bloomberg, Standard & Poor's, and Valueline.

The $\beta$ value for the publicly traded company beta may be located through one of the commercial listings and used unless the $\beta$ value is substantively different from peer group values. In particular, if the $\beta$ value is substantially different from a $\beta$ value for the relevant industry, then the industry $\beta$ value should be used in Equation 12 unless a clear rationale exist for the difference in the company's $\beta$ value. In selecting related companies in the relevant industry for comparison, each company included in a diagnostic should adhere to a logical rational and set of criteria.

Figure 5:
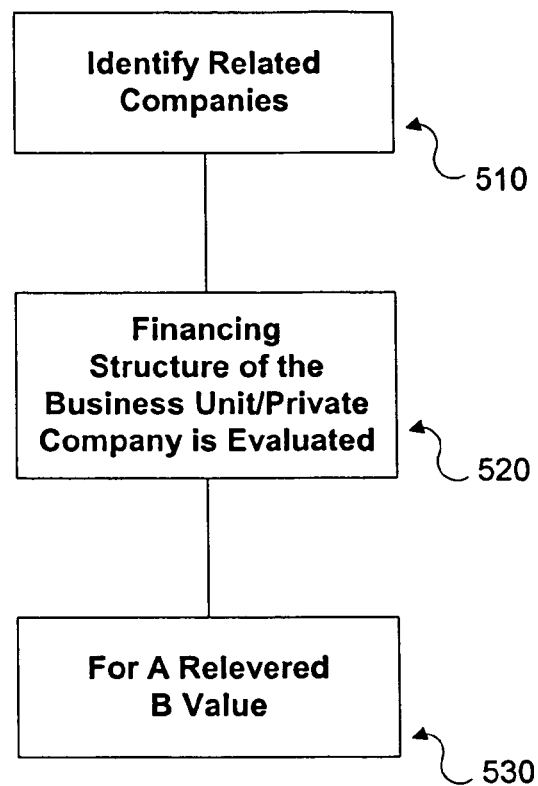

With a business unit or private company, the $\beta$ values may be taken from related publicly traded organizations with similar capital structures. More specifically, when valuing a division or a non-publicly traded company, the $\beta$ value for Business Unit/Private Company may be determined using a $\beta$ value calculating method 500 provided in FIG. 5. In the $\beta$ value calculating method 500, the first step 510 is to identify listed companies that operate in the same field and to determine the $\beta$ value for these related businesses. An initial estimate of a $\beta$ value for the Business Unit/Private Company is calculated by averaging or otherwise combining the unlevered $\beta$ values of the related companies. Next, in step 520, the financing structure of the Business Unit/Private Company is evaluated using known techniques to estimate the effect of the financing structure on the $\beta$ value, as described in greater detail below. Consequently, a relevered $\beta$ value for the Business Unit/Private Company is formed in step 530 by adding in any impact of the financing structure.

As described above, the $\beta$ value calculating method 500 includes adjusting the $\beta$ value in step 520 for the capital structure of the company of interest, since $\beta$ values tend to increase as companies become more highly leveraged. To reflect this relationship between leverage and $\beta$ value, Equation 13 may be used to modify reference $\beta$ value(s) according to the company's debt-to-equity ratio.

$$\beta_U = \frac{\beta_L}{\left[1 + (1 - T_c) * \frac{D}{E}\right]} \quad \text{(Eq. 13)}$$

Where: $\beta_U$=beta without leverage;

$\beta_L$=beta with leverage;

$T_c$=the corporate marginal tax rate; and

D/E=the debt-to-equity ratio based on market values.

Figure 6:
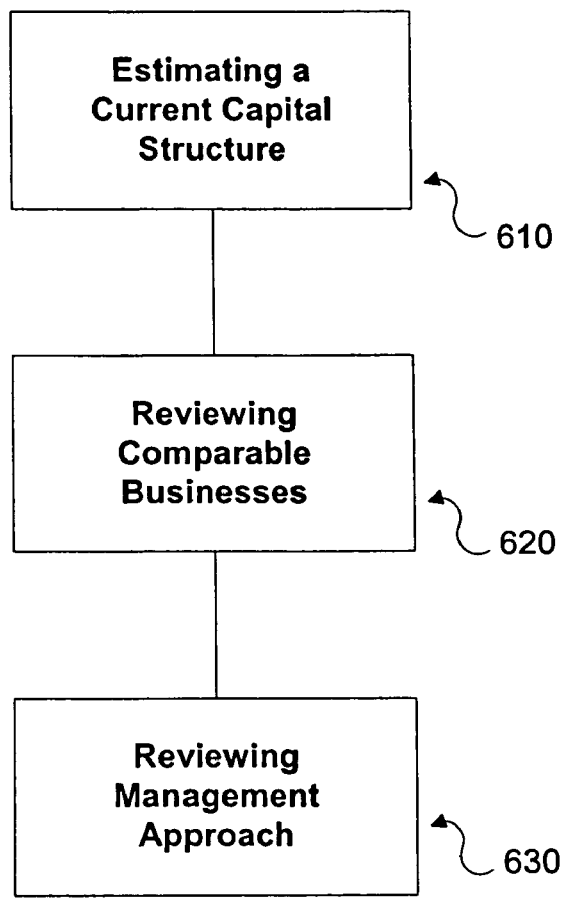

In evaluating capital structures, it may be helpful to think in terms of choosing a "target" capital structure based on market weights of invested capital. The use of a target capital structure may be advantageous because a current capital structure may not reflect a long-term capital structure that is expected to persist. In this case, market weights of debt and equity may be used to reflect the true economic claims of investors. A Target Capital Structure Development process 600 for developing a Target Capital Structure is provided in FIG. 6 and includes estimating a current capital structure in step 610, reviewing comparable businesses in step 620; and reviewing management approach in step 630. Estimating a current capital structure in step 610 may include identifying financing associated with business of interest, converting these financing values to market values, and then calculating a market-based capital structure. Likewise, the reviewing of comparable businesses in step 620 includes the identifying of financing values for comparable businesses, converting these financing values to market values, and then calculating a market-based capital structure. The reviewing of the management approach in step 630 includes understanding the financial structure targets for the business of interest.

EXAMPLE

In this example, a company has the following financial numbers:
$\beta_L = 0.79$
$T_R = 40\%$
E=$2,781 Mill.
D=$747 Mill.
$R_F = 4.93\%$
$R_M - R_F = 5\%$
$K_D = 7.2\%$ For the company in the analysis, the $\beta$ value is preferably unlevered using Equation 13, as described above. Thus, the company has $$\beta_U = \beta_L / [1 + (1 - T_R) * D/E]$$
$$= .79 / [1 + (1 - 40\%) * (747/2781)]$$
$$= .68.$$

As described above, the unlevered beta values $\beta_U$ should generally fall close to the industry average (within a range of ±0.25). Unexplained outliers should be adjusted to the industry average to account for measurement errors in calculating betas. For instance, if the industry for the company in this example has an average $\beta_U$ of 0.35, the difference between the two $\beta_U$ values exceeds the 0.25. Accordingly, the cost of equity should be recalculated using the industry average $\beta_U$ value ($\beta_{U(Industry)}$). Returning again to the application of Equation 12 in this example and using the industry average $\beta_U$ value ($\beta_{U(Industry)}$), $$\beta_U = \beta_{U(Industry)} / [1 + (1 - T_R) * D/E]$$
$$= .35 / [1 + (1 - 40\%) * (747/2781)]$$
$$= .41$$

Once the $\beta$ value for the company is relevered, a revised WACC may be calculated as follows. First the Weighted Cost of Debt is determined using Equation 10.

$$\text{Weighted Cost of Debt} = K_D * (1 - T_R)[D/(D + E)]$$
$$= 7\% * (1 - 40\%)(747/3528)$$
$$= .9\%$$

Likewise, the Weighted Cost of Equity may be determined using Equations 11 and 12.

$$WCE = [R_F + (R_M - R_F) * \beta] * [E/(D + E)]$$
$$= [4.93\% + (5\%)(.41)] * (2781/3528)$$
$$= 7.0\% * 78.8\%$$
$$= 5.5\%$$

Thus, the WACC for the company in this example is the sum of the Weighted Cost of Debt and the Weighted Cost of equity, or 6.4%.

Equipment Leases

Operating leases may require special treatment in the calculation of both ROIC and WACC in steps 210 and 220. For instance, a company may have the option of leasing or purchasing equipment. In substance, operating leases represent a type of financing similar to long-term debt. In application, leases are treated very differently from debt in the financial statements. For instance, a company may assume long-term debt to pay for purchased equipment. Using the shareholder value calculation method 100 described above, companies that lease would have much higher ROIC. Accordingly, a preferred embodiment of the present invention makes an adjustment to prevent manipulation of the ROIC values through accounting decisions. Specifically, operating leases may be adjusted on the financial statements to treat the leases as debt and fixed assets by decreasing COGS (Cost of Goods Sold) in the income statement by the amount paid on the lease and increasing the PP&E (Property, Plant, and Equipment) and Debt values in the balance sheet by the next year's lease payment divided by the cost of debt ($K_d$).

Retirement Liabilities

Retirement liabilities may also require special treatment in the calculation of both ROIC and WACC in steps 210 and 200. Retirement Liabilities represent two types of costs, Financial Accounting Standard (FAS) 87 liabilities for unfunded pension liabilities and FAS 106 liabilities for unfunded post-retirement benefits other than pensions. According to standard accounting conventions, unfunded retirement liabilities are treated very differently from debt in the financial statement even though the unfunded retirement liabilities represent a type of financing similar to long-term debt. As a result, companies with unfounded retirement liabilities would have understated NOPLAT and Invested Capital, thereby altering the final return on investment for shareholders as calculated through shareholder value calculation method 100. In the income statement, the retirement liabilities would cause increases or decreases in Liability as reflected in operating expense. Similarly, retirement liabilities included on a balance sheet as a long-term liabilities reduce Invested Capital on a "where to" and a "where from" basis. Thus, a preferred implementation of the present invention adjusts for retirement liabilities in financial statements by treating the retirement liabilities as debt. Specifically, the SG&A (Selling, General, & Administrative Expenses) in the Income Statement is reduced by the product of the Liability Amount and the Cost of Debt. For the calculation of NOPLAT in step 210, an implied interest expense is estimated on the liability for the year, and a portion of operating expenses equal to this amount is reclassified as interest expense. Similarly, the Balance Sheet may be modified by reducing the other long-term liabilities by the Liability Amount and conversely increasing the debt by the Liability Amount.

Growth

Figure 7:
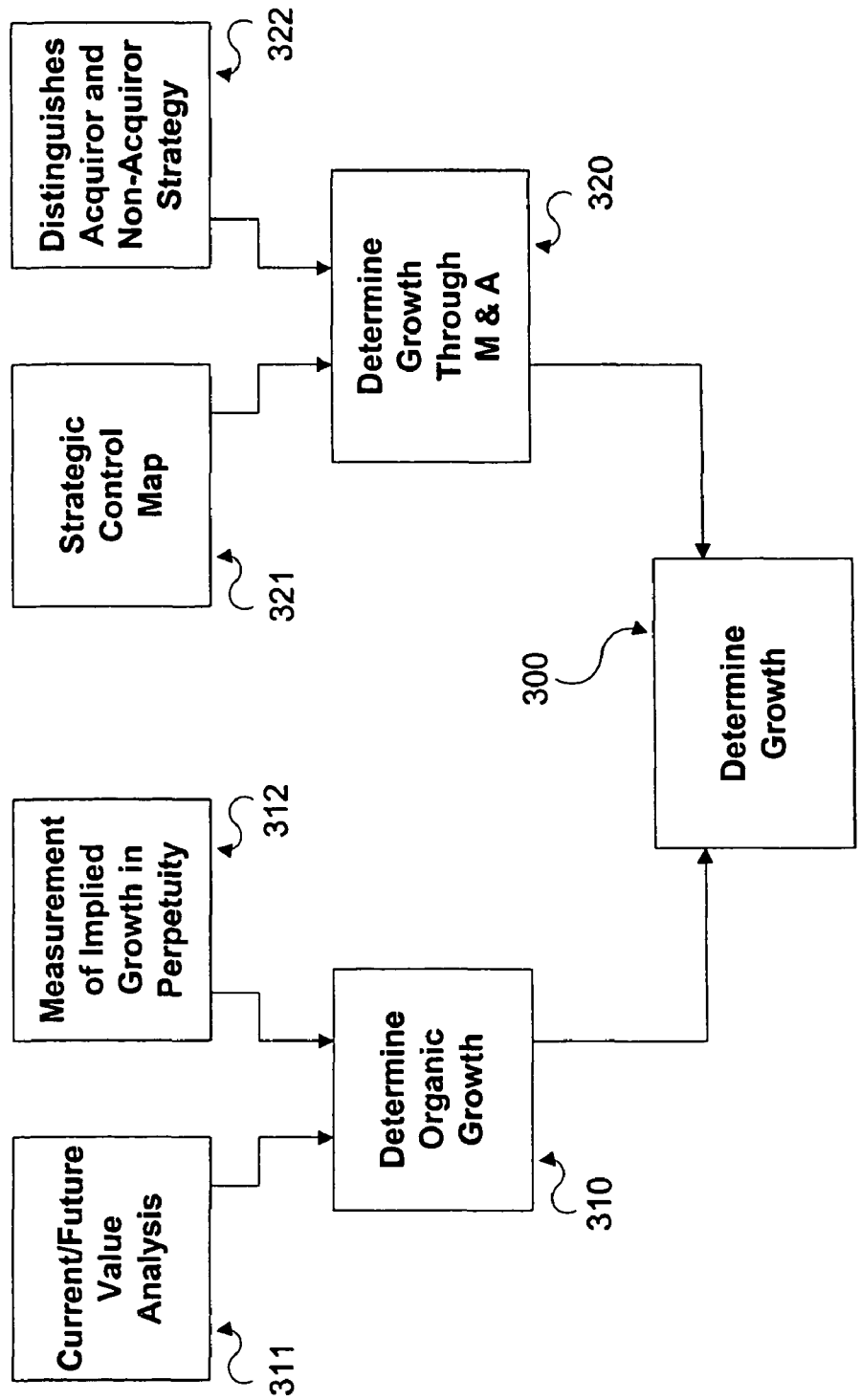

Returning now to FIG. 1, the shareholder value calculation method 100 further includes the calculation of the change in the value of the company caused by growth in step 300, both organic growth measured in step 310 and growth through mergers and acquisitions (M&A) calculated in step 320. Turning now to FIG. 7, the calculation of organic growth in step 310 generally uses current/future value analysis in step 311 and measurement of implied growth in perpetuity in step 312. The calculation of M&A growth in step 320 uses a strategic control map to examine the growth in step 321 and distinguishes acquirer and non-acquirer strategies in step 322.

The calculation of organic growth is step 310 uses an analysis of the current and future value of the company to breakdown the market value of a firm into a current operations value and a future value of investments. In particular, the present invention looks to the value of the company and identifies the value of current operations. The difference between the current value of the company and the value of current operations represents the expected future growth value, as specified in Equation 14.

Expected (Growth) = Enterprise Value − Value of Current Operations (Eq. 14)

In Equation 14, the Enterprise Value represents the value of the enterprise, which is typically reflected as the market value of debt and equity (the market value of debt plus the market capitalization of common and preferred shares). The value of current operations reflects the value of the current operations in perpetuity. Typically, the value of current operations is calculated by showing current NOPLAT in perpetuity, as represented by the ratio of NOPLAT to WACC. Thus, the future value determined in Equation 14 represents the markets' expectation regarding the ability to sustain current NOPLAT in perpetuity.

Returning to FIG. 7, the determining of organic growth in step 310 continues with a measurement of implied growth in perpetuity in step 312. By analyzing long-term expectations about growth implied in a company's stock price, companies with potential growth challenges may be identified. The implied growth represents investors' expectations of future cash flows in perpetuity. The measurement of implied growth in perpetuity begins with a determination of the enterprise value of the firm (market debt plus equity), which reflects the market's current value assessment of the company. The enterprise value of the firm is a readily available figure that is available through the share price. Next, the measurement of implied growth in perpetuity continues with a forecast of free cash flow based on consensus analyst opinions. In particular, free cash flow may be estimated for a future period, such as the next five years, based on analysts' forecasts. The measurement of implied growth in perpetuity continues by discounting the above-described free cash flow forecasts to determine how much of the current enterprise value is reflected in the markets estimate of free cash flow for the forecasted period, such as the next five years. The present value of the free cash flow estimate for the prediction period may then be subtracted from the enterprise value to calculate the continuing value of the business. The continuing value is then undiscounted to determine its present value. For instance, the continuing value of the business may be divided by $[1/(1+WACC)]^n$, where n represents the number of periods of prediction.

Equation 15 represents the relationship between the continuing value (CV) and growth rate g:

$$\text{Continuing Value} = \frac{NOPLAT\left(1 - \frac{g}{ROIC}\right)}{WACC - g} \tag{Eq. 15}$$

Using simple algebra, Equation 15 may be modified to solve for g in the below described process:

$$CV = [NOPLAT(1 - g/ROIC)]/(WACC - g) \tag{Eq. 15}$$
$$= NOPLAT[1 - g(1/ROIC)]]/(WACC - g)$$
$$= [NOPLAT(1) - (NOPLAT)(g)(1/ROIC)]/(WACC - g)$$
$$CV(WACC - g) = NOPLAT - (NOPLAT)(g)(1/ROIC)$$
$$CV(WACC) - CV(g) = NOPLAT - (NOPLAT)(g)(1/ROIC)$$
$$-CV(g) = NOPLAT - (NOPLAT)(g)(1/ROIC) - CV(WACC)$$
$$-CV(g) + NOPLAT(g)(1/ROIC) = NOPLAT - CV(WACC)$$
$$-g(CV - NOPLAT(1/ROIC)) = NOPLAT - CV(WACC)$$
$$-g(CV - NOPLAT/ROIC) = NOPLAT - CV(WACC)$$
$$-g = [NOPLAT - CV(WACC)]/[CV - NOPLAT/ROIC]$$

Thus, g may be defined as indicated in following Equation 15':

$$g = -\frac{NOPLAT - (CV * WACC)}{CV - \frac{NOPLAT}{ROIC}} \tag{Eq. 15'}$$

The calculation of a value for G using Equation 15' may be further simplified by making several assumption such as:

NOPLAT = the value for NOPLAT in year after the cash flow predictions (typically year 6 after a five year prediction);
CV = undiscounted continuing value calculated previously
WACC = WACC as of year 0 of the evaluation; and
ROIC = WACC plus a premium, such as 1%.

Please note that the ROIC premium above WACC is largely dependent on the industry. Commodity-based industries will typically experience industry returns equal to WACC in perpetuity, while industries with high barriers to entry (such as pharmaceuticals) may have a premium above WACC of 2%).

In the absence of free cash flow estimates, g can be solved using Earnings per Share (EPS) estimates, as embodied in Equation 16:

$$g = [NI-(CV)(COE)]/[CV-(NI/ROE)] \quad \text{(Eq. 16)}$$

Where
NI=Net Income after the period of cash flow predictions;
CV=undiscounted continuing value calculated previously;
COE=$K_e$ as of year 0 from the WACC calculation; and
ROE=COE plus a premium, such as 1%, as described above.

A negative value for Current Operations may warrant further study of historical trends in NOPLAT or may suggest exceptional changes in deferred taxes. In the same way, Growth cannot be greater than WACC in the Continuing Value calculation of step 312, as described in greater detail below.

Without discerning between M&A growth and organic growth, revenue growth for some companies may seem exceptional because M&A activity may greatly affect the ROIC values for a company. Thus, revenue associated with acquired or divested units should be incorporated in an analysis of organic revenue growth. Typical adjustments may include subtracting acquisition revenues in the year purchased and all subsequent years; adding back divested revenue in the year of the divestiture and all subsequent years; or calculating Compound Annual Growth Rate (discussed below) using final revenue divided by the sum of companies revenue at the beginning of the period. Possible additional adjustments include discounting acquisition revenues by 5-10% to account for revenue dis-synergies outside of management control, pro-rating revenue adjustments in the first year based upon the timing of the transaction; or checking company news archives to ensure a complete transaction list is obtained. Generally, adjustments should not be made for carve-outs or stock purchases in subsidiaries where revenues consolidated in the company's financial reports do not change.

Returning to step 320, the growth of a company's value attributed through mergers and acquisitions may use a Strategic Control Map in step 321. A strategic control map graphically illustrates shows how M&A activity has affected a relevant industry's overall structure, as well as the relative position of members of that industry. The Strategic Control Map generally compares the performance of companies (e.g., as embodied by market-to-book values ratios or the market values) to the size or book values of the companies.

The industry may then be divided into categories, such as Niche/Specialist businesses that are small but have high performance, Leaders that are large and perform will, Targets that are small and do not perform well, and Lumbering Giants that are large but do not perform well. In general, the Niche/Specialist businesses have high returns from small amounts of invested capital; compete in niche/value added segments; typically are not acquisition targets by virtue of market value; face challenges to grow given their niche orientation; and may become attractive targets for acquisition if their market value declines because of their unique capabilities. In contrast, the marker leaders usually have high returns from large amount of invested capital; compete in broad segments; typically offer significant acquisition opportunities by virtue of market multiples; utilize scale effectively; but may face challenges to identify value-creating growth opportunities given their large size. Target companies have low returns from small amount of invested capital; typically have domestic competitors in global industries; are vulnerable to competitors that can generate higher returns on the same asset base; and face challenges to improve operations or be taken out. Lumbering giants having large size but poor performance have low returns from large amount of invested capital; have an inability to leverage scale; despite low market value, are typically not popular targets for acquisitions because of their large sizes helps to deter purchasers; and face the challenge of correcting for under performing operations to generate greater returns on invested capital.

Continuing with step 320, to determine growth from M&A, the company is assessed using acquirer and non-Acquirer strategies in step 322. As described above, unadjusted calculations incorrectly show high growth rates for acquisitive companies but adjusting for M&A activity reveals a clearer picture of organic growth. Return to Shareholder performance of acquisitive and non-acquisitive competitors may be compared using the above-described techniques to highlight the relative importance of M&A. For instance, active acquirers' Total Return to Shareholders may be compared to Competitors in related industries.

Absolute growth for a company of interest is provided in Equation 17:

$$\text{Absolute Growth} = \left(\frac{\text{Ending Stock Price} + \text{Accumulated Dividends}}{\text{Beginning Stock Price}}\right) - 1 \quad \text{(Eq. 17)}$$

The absolute growth rate may then be modified, as shown in Equation 18, to calculate the Compound Annual Growth Rate (CAGR)

$$CAGR = \left(\frac{\text{Ending Stock Price} + \text{Accumulated Dividends}}{\text{Beginning Stock Price}}\right)^{\frac{1}{n}} - 1 \quad \text{(Eq. 18)}$$

where n is the number of periods of interest. For instance, if a stock appreciates from $50 to $70 and pays $3 in dividend in a 3 year period (i.e., n=3), then $$CAGR = [(70+3)/50]^{1/3} - 1 = 13.4\%$$

In situations in which there have been no material changes to the stock, the CAGR may represent company's growth. However, various events may modify the value of a stock without materially changing the TRS. For instance, a stock split generally represents an increase in the number of shares and a reduction in the price per share with no associated change in value. In the same way, a portion of a company may be spun off to form a new business with its own stock. The value of the original company's stock will decrease, but this decrease will be offset by the value of stocks issued by the spin-off company.

Return to Shareholders

The spread determined in step 200 is the difference between the ROIC and the WACC. The growth determined in step 300 is the CAGR, adjusted as necessary. The total return to shareholders (TRS) calculated in step 110 is then the sum of the spread and the growth.

It should be appreciated that the calculation of Return to Shareholders may be sensitive to the start date. In general, TRS should be calculated over a full business cycle while avoiding start dates that include extraordinary company events such as the resignation/hiring of management officials; earnings releases; regulatory changes; or major changes in corporate structure. In the same way, start dates affected by global economic events should be avoided since global economic events may falsely inflate/deflate industry returns.

Preferably, TRS is calculated over several time periods to ensure the results are similar regardless of the starting point and timeframe. Thus, outliers and anomalies should be identified and avoided. If necessary, TRS may be calculated by comparing the company to those which have more varied tiering of stock value. Alternatively, a logical breakdown of the tiering may be used to identify relevant competitors or the tiering may be based on a median composite index.

Upon calculation of TRS in step 110, the company may be evaluated to determine potential value drivers. The value levers may be developed through an iterative, hypothesis driven process. Each industry is unique and has its own set of value levers. Nonetheless, some common value lever themes cross industries. A value driver for an industry often demonstrates a strong correlation with TRS. Value levers help to explain why some companies create value while others destroy value.

System 800

Figure 8:
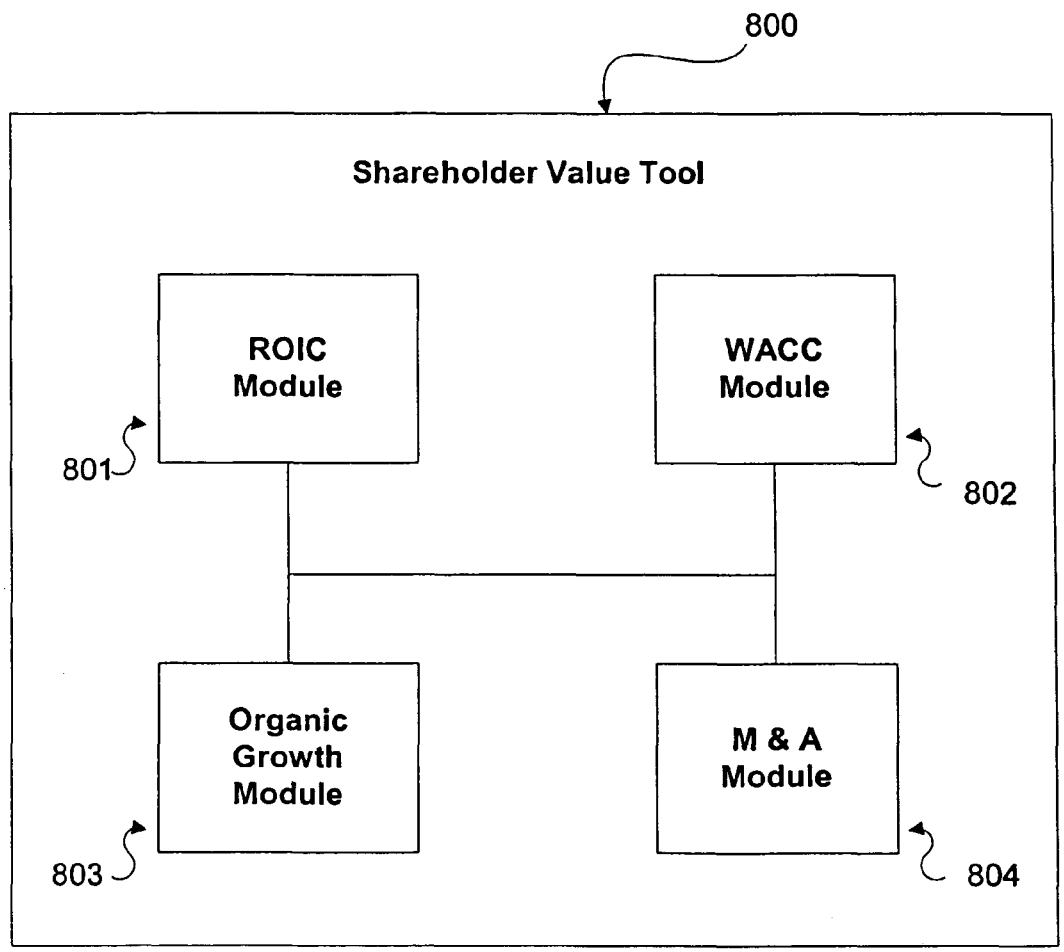
FIGS. 8-9 and 11-12 schematically depicts a shareholder value tool for implementing the steps of the shareholder value calculation method of FIG. 1 in accordance with embodiments of the present invention.

The steps of the shareholder value calculation method 100 may be implemented through a shareholder value system 800. As depicted in FIG. 8, the shareholder value system 800 may be a software-driven application including modules that automatically perform each of the steps of the shareholder value calculation method 100. Specifically, the shareholder value system 800 may have modules 801, 802, 803, and 804 for calculating, respectively, the ROIC, WACC, Organic Growth, and Growth through M&A. For instance, in one implementation, the shareholder value tool 800 is a spreadsheet application (such as an application written in VisualBasic® for Excel®, both marketed by Microsoft Corp. of Redman, Wash.) that receives various financial data and user inputs, and uses these inputs to calculate the Spread and Growth numbers as needed to calculate TRS.

In another embodiment, the Shareholder Value Tool 800 may be connected to a user 910 and a financial data repository 920 via a distributed network, such as the Internet. The financial data repository 920, as described above, may be the EDGAR website administered by the United States Security and Exchange Committee, commercial services such as Standard and Poor's Compustat database at www.Compustat.com or Thomson Financial's Global Access database at www.Primark.com, or other publicly accessible source of financial data. In this embodiment, the Shareholder Value Tool 800 may be an application present on an Internet server and is accessible to various users and applications via the distributed network. Conversely, the Shareholder Value Tool 800 may accept various inputs from the user 910 and the financial data repository 920. For instance, the Shareholder Value Tool 800 may include software application such as data mining applications in Extended Meta Language (XML), not depicted, that automatically search for and return relevant information from the financial data repository 920.

Figure 10:
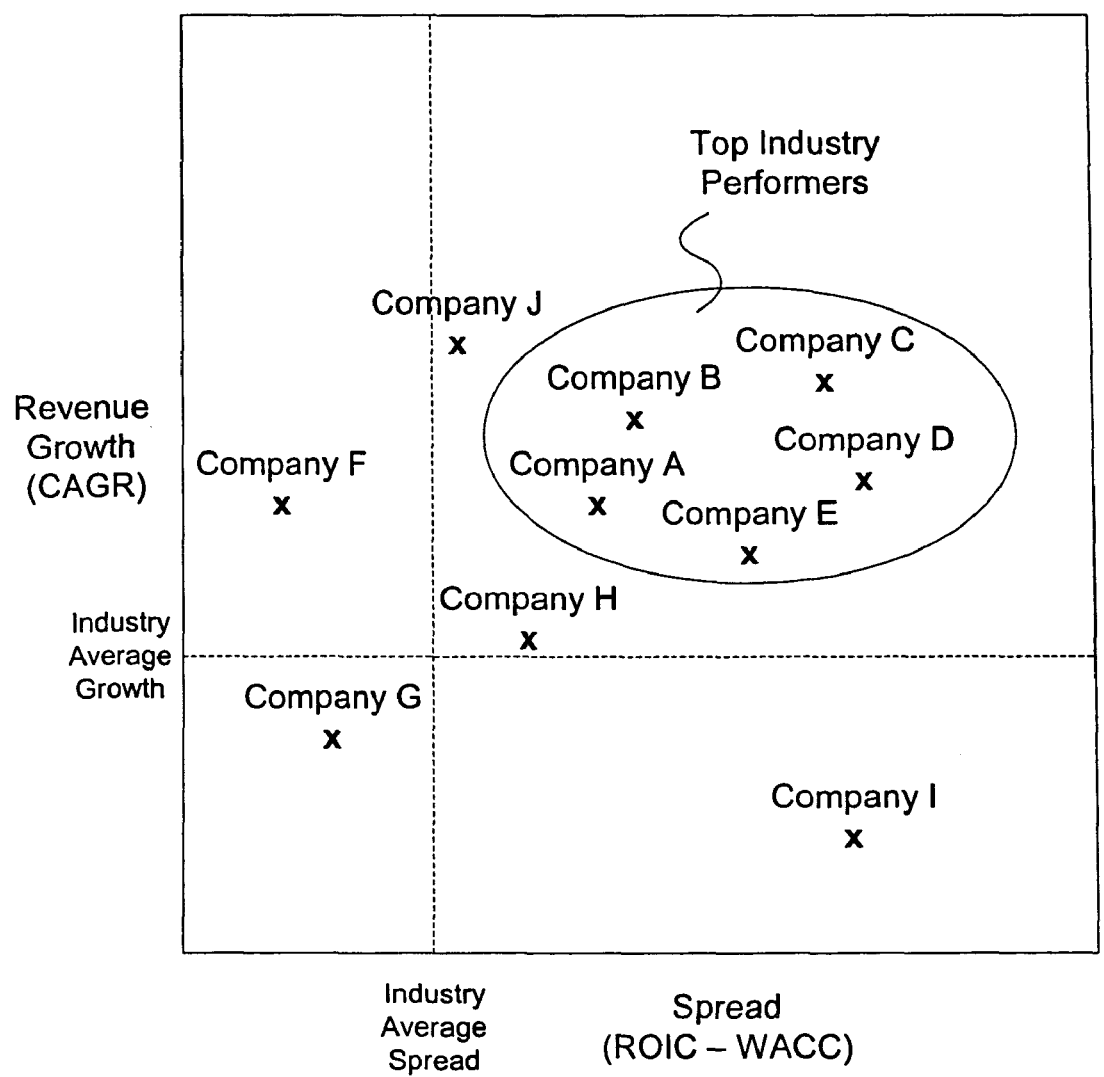
FIG. 10 depicts an exemplary output graph summarizing the findings of the shareholder value calculation method of FIG. 1 in accordance with embodiments of the present invention.

The Shareholder value tool may further visually display results, as depicted Shareholder Return Graph 1000 in FIG. 10. In particular, the Shareholder Return Graph 1000 compares growth [as represented by the Compound Annual Growth Rate (CAGR)] and the spread [as measured by the difference of the return to investors and the weighted cost of capital]. Logically, companies having above-average growth and spread have higher rates of return. Thus, the Shareholder Return Graph 1000 identifies such companies as top industry performers.

Figure 9:
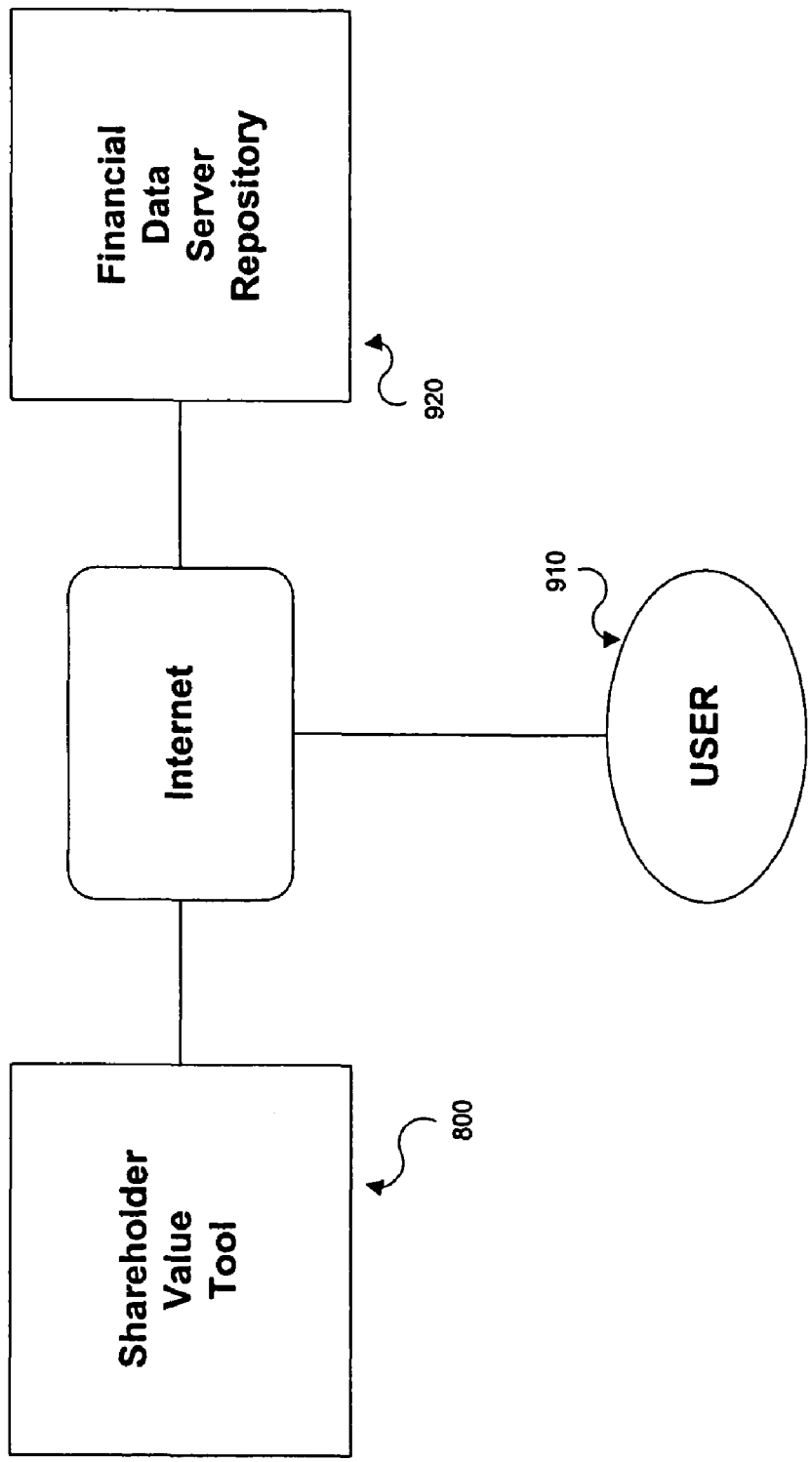
Figure 11:
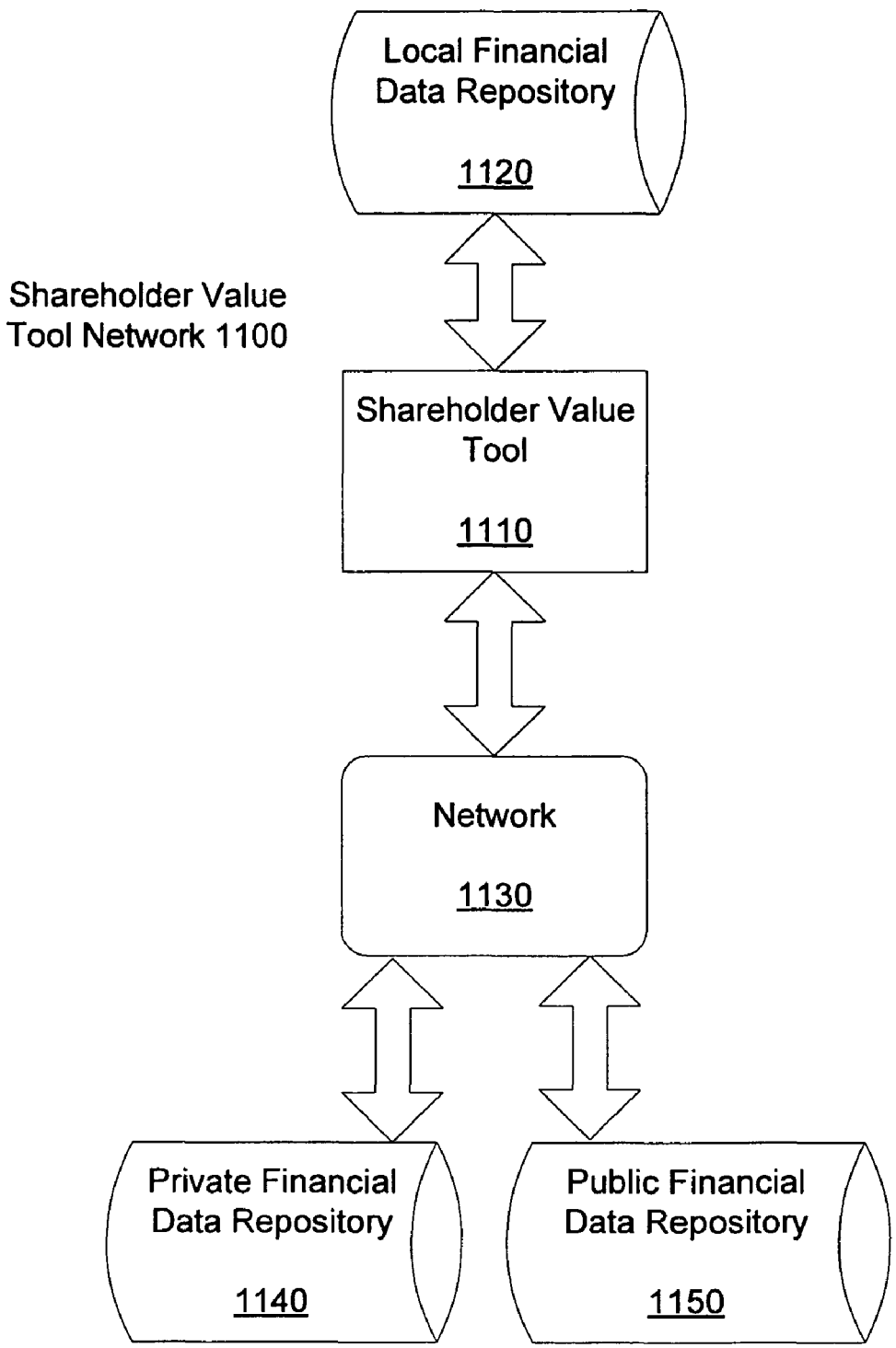

Referring now to FIG. 11, a shareholder value network 1100 having a shareholder value tool 1110, similar to the configuration in described above in FIG. 9, is now described. The shareholder value 1110 may be a dedicated application, coded using known techniques or programming language (such as VisualBasic®), to implement the methods and processes described herein. The shareholder value tool 1110 may be functionally connected to a local financial data repository 1120, such as a known data storage device or data storage network, for storing financial data collected over a network 1130 from public financial data repositories 1150, as described above. The shareholder value tool 1110 may further connect with a private financial data repository 1140 that contains information not generally available to the general public. For example, an organization may implement the shareholder value network 1100 to assess its own performance and to predict future shareholder value.

In operation, the pre-collection of relevant financial data in the local financial data repository 1120 offers significant performance advantages. In exchange for the computation and time cost associated with the collection and local storage of the financial data, the shareholder value network 1100 may operate much more rapidly using the financial data contained in the local financial data repository 1120 since the data collection is a relatively time-consuming process. This advantage is particularly present where the shareholder value tool is used several times on the same financial data. For example, the shareholder value tool 1110 may be used to analyze several different competing organizations in the same industry. Similarly, as described in greater detail below, the financial data in the local financial data repository 1120 may be adjusted to reflect various changes, actual or proposed, and the shareholder value tool 1110 may be used to analyze the changes in shareholder value resulting from these changes.

Figure 12:
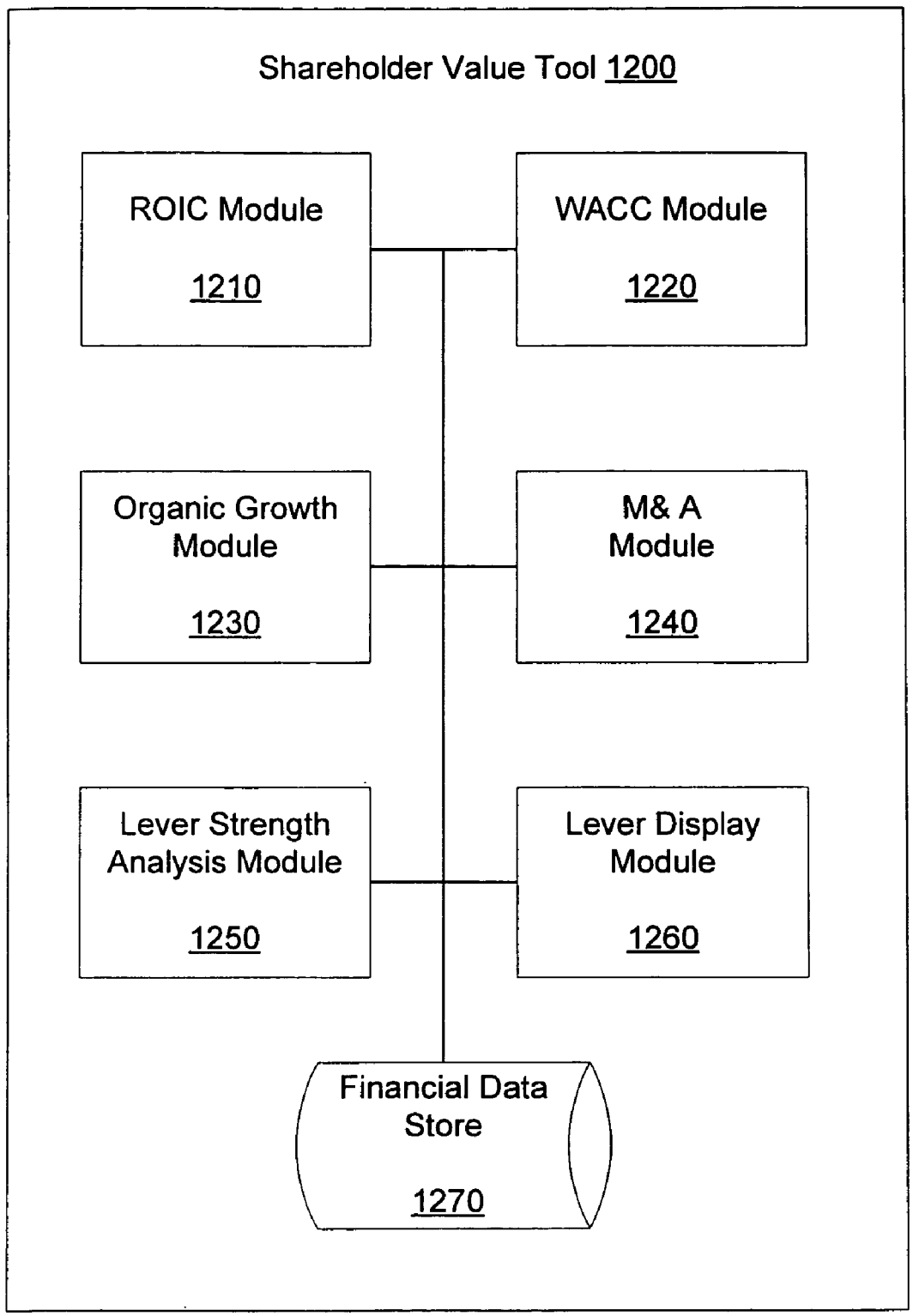

Turning now to FIG. 12, a shareholder value tool 1200 implemented in embodiments of the present invention is now described. As with the embodiment of the shareholder value tool 800 described above in FIG. 8, the shareholder value system 1200 may be a software-driven application including modules that automatically perform each of the steps of the shareholder value calculation method 100. Specifically, the shareholder value system 1200 may have modules 1210, 1220, 1230, and 1240 for calculating, respectively, the ROIC, WACC, Organic Growth, and Growth through M&A, corresponding to previously described modules 801, 802, 803, and 804. Complementing these modules 1210, 1220, 1230, and 1240 is a financial data store 1270 corresponding to the local financial data repository 1120.

Figure 13:
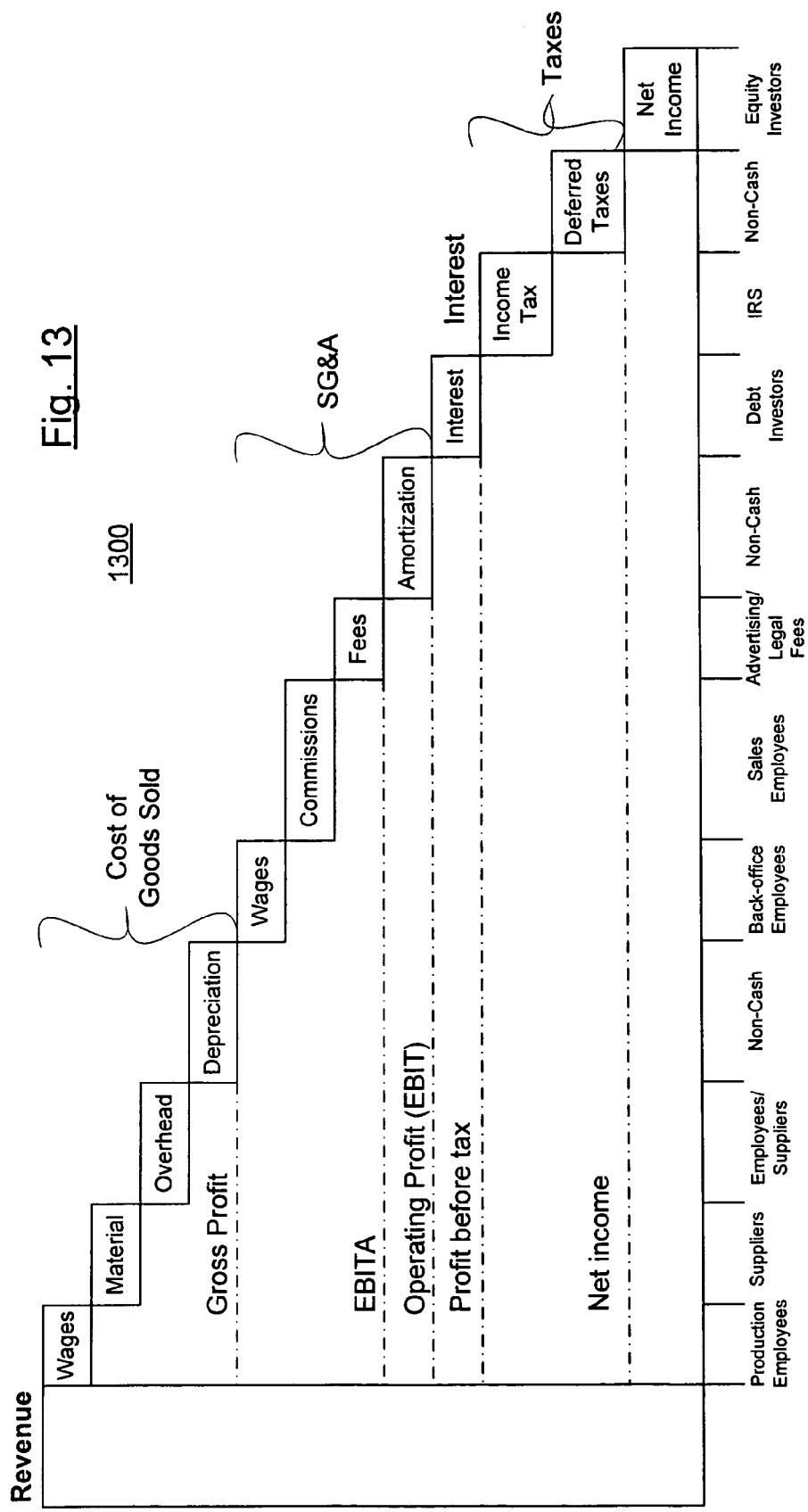

Continuing with FIG. 12, the shareholder value tool 1200 further comprises a lever strength analysis module 1250. The lever strength analysis module 1250 analyzes the various accounting constituents of the shareholder value, as determined through the shareholder value calculation method 100. For example, chart 1300 in FIG. 13 expands on the Income Statement 20 of FIG. 3 and depicts various accounting values used to determine return to shareholders according to the shareholder value calculation method 100. Typical levers include wages of various types of employees, fixed or variable costs, worker productivity, projected sales numbers and prices, etc. Various other levers are described above in connection with the calculation of shareholder return, according to shareholder return calculation method 100. It should be appreciated that virtually any known financial measure may be used as a lever to analyze an organization's return to shareholders and the results of changes from the lever.

The lever strength analysis module 1250 works, as described in greater detail below in FIG. 14 and the related text, by analyzing the effects of changing one or more of the various accounting measures. The lever strength analysis module 1250 may calculate the effects to shareholder return from changes in the levers. This may help identify areas in which an organization can change to improve returns to shareholder and areas where changes would have little impact on shareholder return. For example, an organization may already have low labor costs, and changes causing reduction in labor costs may have little benefit to shareholder return. In the same way, the lever strength analysis module 1250 may predict the shareholder return changes from the multiple financial changes caused by a complex business decision, such as the hiring of additional employees that increases overall productivity while increasing labor costs. Changes in the lever values may be programmed by a user or may by automatically determined by the shareholder value tool 1200 by other known applications for predicting the effects of business changes. For example, various known return on investments (ROI) tools predict economic number changes to an organization resulting from various technology expenditures, and these types of know application may be used to predict changes to the levers. Alternatively, the changes to the levers caused by various business activities may be studied and accessed, as described in co-owned pending U.S. application Ser. No. 10/609,690 filed on Mar. 18, 2004 the subject matter of which is incorporated by reference in full.

The results of the lever strength analysis module 1250 may be stored in the Financial Data store 1270, and a lever strength graphical display module 1260 may then graphically display the results. The resulting graphical display may be in any form or format. The graphical display may also compare the relative lever strength between different related companies, similar to the Shareholder Return Graph 1000 in FIG. 10. Instead of displaying the differences in shareholder value return between different companies, the resulting display would present the differences in lever performance between the different companies. As described in greater detail below, the present invention thereby allows a comparison of performance in specific areas as measured by their effects on shareholder return. For example, the research and development expenditures (R&D) of different companies in an industry may be compared so that companies over or under investing may be identified, according to the relative ability of the research and development expenditures to change the shareholder return of each of the companies. Companies that are very sensitive to increased research and development likely under invest whereas companies whose shareholder return is insensitive to increase research and development likely already invest sufficiently in R&D or otherwise suffer from other limitations that limit the benefits of additional R&D.

Figure 14:
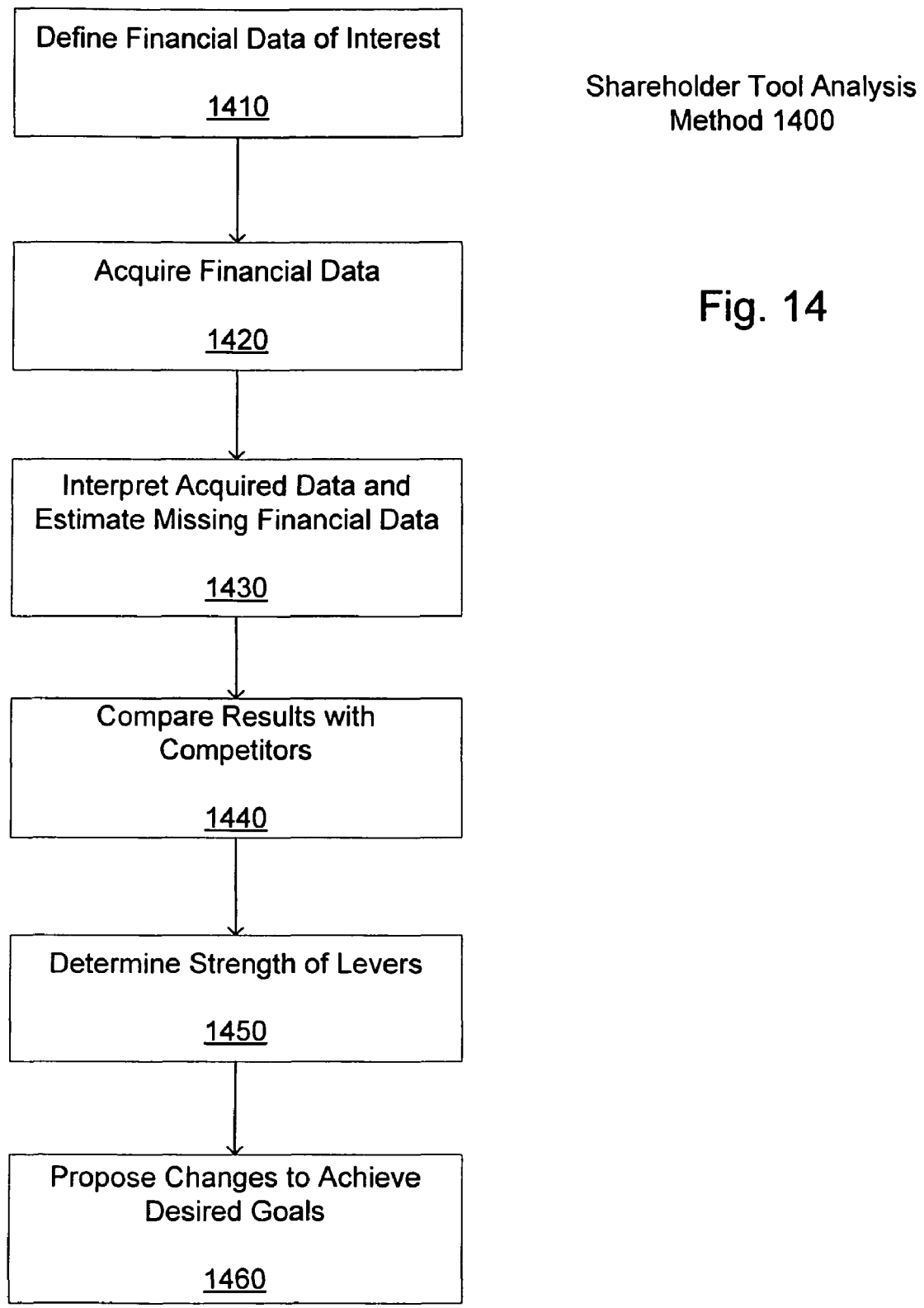
FIG. 14 depicts the steps in a shareholder value lever analysis method that in accordance with embodiments of the present invention.

Turning now to FIG. 14, a shareholder value lever analysis method 1400 may be used to analyze an organization's return to shareholder and the effects of changing various levers used in calculating that shareholder return. The value of this functionality arises because shareholder return is often generally known, but the constituting factors (the levers) impacting the shareholder return and the relative importance of these factors is often ambiguous at best. Accordingly, other embodiments of the present invention provide an automated tool and method for analyzing the causes for shareholder return and for assessing changes according to their probable impact on shareholder return. Often, it is particularly difficult to evaluate business actions because the actions have complex, conflicting results that are difficult to assess as a whole. For example, in the situation of acquiring new equipment, the equipment typically has upfront purchase costs as well as continued maintenance costs that must be counter-balanced against the proposed benefits, such as increased worker productivity. An equipment upgrade may further improve the quality of goods and services, thereby increase sales volumes and prices. While traditional policy analysis tools address attempt to provide a numerical analysis addressing these types of the economic factors, the traditional analysis tools were wildly inaccurate in predicting the end result of particular importance—the overall benefit to an organization and its shareholders.

Referring back now to FIG. 14, the shareholder value lever analysis method 1400 begins with defining and acquiring financial data of interest, respectively, in steps 1410 and 1420. As previously described above in the discussion of the shareholder value method 100, the definition of the financial data of interest in step 1410 generally includes defining an organization of interest and determining relevant financial data as available on public data records. Where private financial information is available or needed, this private information designated for use as well. The information defined in step 1410 generally includes accounting data as needed to perform the various steps and calculations involved in the shareholder value analysis method 100 or other similar shareholder value calculations. For many publicly trade organizations, the shareholder return is already available in the form of stock value changes and dividends and bond payments. The selected materials are then obtained in step 1420 using known methods and technology and may be stored in a data storage device, such as the financial data store 1270.

Continuing with FIG. 14, the acquired financial data is then interpreted in step 1430 using the shareholder return analysis method 100 or other known financial data process for addressing the factors impacting shareholder value. As suggested above, the shareholder return may already be known and the shareholder value analysis methods may be used in reverse to estimate missing or unavailable financial data. In optional step 1440, a similar process (mirroring steps 1410-1430) may be used for competitors so that a company's shareholder return and constituting factors may be compared to its competitors. Step 1440 generally comprises manually selecting organizations or otherwise manually selecting a relevant industry and automatically analyzing the companies included in the selected industry.

Continuing with FIG. 14, the strength of various levers may be analyzed through various known sensitivity analysis techniques that first slightly change one or more financial data inputs and then determine the results of the changes. For example, various financial data inputs may be individually manipulated by predefined adjustment amounts and adjustment ranges to determine the results of these changes to shareholder return. For example, it is typically found, for example, that relatively mature companies are rather insensitive to changes in advertising expenditures since the companies are already relatively well known. As discussed above, a lever may be any type of known, definable cause impacting shareholder value, such as the various values defined above in connection with the shareholder return analysis method 100. In step 1450, the strength of a lever may likewise be determined for competitors, and relative lever strengths for the competitors may be compared. Overall, this analysis allows a user to determine the relative ability of any single factor or combination of factors to improve shareholder return.

Once the relative lever strengths are determined in step 1450 (i.e., determine the ability of various accounting changes to improve shareholder performance), these results may be used in step 1460 to assess proposed changes or to propose changes to achieved desired changes in shareholder value. To propose changes, a strong lever is identified, and changes leading to changes in this lever are forwarded. For example, the above reference co-owned U.S. patent application Ser. No. 10/609,690 provides a link to case studies that present changes to levers resulting from various business changes.

In a similar way, proposed business actions may be assessed according to their predicted changes to one or more levers. As described above, there are various known methods and tools to predict the accounting effects from a business action, but these tools do not predict changes to shareholder return from these changes. In step 1460, the present invention may use the results from these tools to assess proposed changes according to their predicted effect on shareholder value. Typically, the financial data collected in step 1420 is adjusted according to the predicted changes from adjustments from the various levers, and the shareholder value is recalculated in step 1430. Alternatively, the levers changed from a business action may be identified by the known applications, and the strength of these levers may be evaluated using the results determined from lever strength analysis in step 1450.

In this way, it can be seen the shareholder value analysis method 100 may be applied as suggested in the shareholder value lever analysis method 1400 to analyze an organization's areas of needs (i.e., areas corresponding to strong levers that may potentially produce improvements in shareholder value). Similarly, the shareholder value lever analysis method 1400 may be used to evaluate proposed actions according to the effects of these actions on the various levers and the relative strengths of the these levers.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A computer-based system for automated performance evaluation of an organization, the system comprising:
  a computerized database storing financial information on the organization;
  a processor for performing instructions for automated performance evaluation of the organization in light of financial information accessed from said computerized database; and
  communication means connecting said computerized database and said processor,
  wherein said instructions performed by said processor include:
    an investment return evaluation module, said investment return evaluation module receiving the accessed financial information and calculating a return on invested capital;
    an organization $\beta$ value determination module, said organization $\beta$ value determination module determining a $\beta$ value of the organization by (1) identifying comparable businesses that operate in the same field as the organization, (2) determining the $\beta$ values of the comparable businesses, (3) averaging the $\beta$ values of the comparable businesses to determine an unlevered $\beta$ value, (4) estimating an effect of the financing structure of the organization using the unlevered $\beta$ value, and (5) determining a relevered $\beta$ value for the organization by adding in the effect of the financing structure;
    an investment costs evaluation module, said investment costs evaluation module receiving the accessed financial information and calculating a weighted average cost of capital using the $\beta$ value of the organization;
    a growth estimation module, said growth estimation module receiving the accessed financial information and calculating a total growth comprising an organic growth and a mergers and acquisitions growth;
    an economic performance calculation module, said economic performance calculation module calculating a total return to shareholders using the calculated return on invested capital, the calculated weighted average cost of capital, and the total growth; and
    a lever strength analysis module, said lever strength analysis module identifying at least one financial change to the organization that would improve the total return to shareholders, and identifying at least one business action by the organization that would cause the at least one identified financial change.

2. The computer-based system for automated performance evaluation of an organization of claim 1, wherein the investment return evaluation module calculates the return on invested capital by calculating an operating margin, by calculating a capital utilization, and by multiplying the operating margin by the capital utilization.

3. The computer-based system for automated performance evaluation of an organization of claim 2, wherein the investment return evaluation module calculates the return on invested capital (ROIC) using the following equation:

$$ROIC = \frac{NOPLAT}{Invested\ Capital}, \text{ where}$$

NOPLAT (net operating profit less adjusted taxes to financial capital contributors) is total operating profits with adjustments for taxes, and Invested Capital represents investor-provided capital.

4. The computer-based system for automated performance evaluation of an organization of claim 3, wherein the investment return evaluation module calculates NOPLAT using the following equation:

$$NOPLAT = EBITA - \text{Cash Taxes}$$

where EBITA (Earnings Before Interest, Taxes, and Amortization) is calculated by determining revenue and adjusting for costs.

5. The computer-based system for automated performance evaluation of an organization of claim 1, wherein Weighted Average Cost of Capital (WACC) calculated by the investment costs evaluation module comprises a weighted sum of costs of debt holders and costs of equity holders.

6. The computer-based system for automated performance evaluation of an organization of claim 5, wherein the investment costs evaluation module calculates Weighted Average Cost of Capital (WACC) using the following equation:

$$WACC = K_d * (1-t) * D/(D+E) + K_e * E/(D+E)$$

where $K_d$ is a cost of debt,
  t is a tax rate on the debt,
  D is a market value of the debt, E is a market value of the equity,
$K_e$ is a cost of equity, and
E/(D+E), a ratio of a value of equity to a value of the total debt and equity is a weighting factor for the cost of equity.

7. The computer-based system for automated performance evaluation of an organization of claim 6, wherein the investment costs evaluation module calculates the cost of equity, $K_e$, using the following equation:

$$K_e = r_f + (r_m - r_f) * \beta, \text{ where:}$$

$r_f$ is a risk-free rate of return available to investors;
$r_m$ is a historic market risk premium; and
$\beta$ is a factor that returns differ from the returns of a market portfolio.

8. The computer-based system for automated performance evaluation of an organization of claim 7, wherein the investment costs evaluation module calculates the β value using the following equation:

$$\beta_U = \frac{\beta_L}{\left[1 + (1 - T_c) * \frac{D}{E}\right]})$$

where: $\beta_U$ = beta without leverage;
$\beta_L$ = beta with leverage;
$T_c$ = the corporate marginal tax rate; and
D/E = the debt-to-equity ratio based on market values.

9. The computer-based system for automated performance evaluation of an organization of claim 1, wherein the investment costs evaluation module adjusts the calculated Weighted Average Cost of Capital (WACC) to reflect an equipment lease.

10. The computer-based system for automated performance evaluation of an organization of claim 1, wherein the investment costs evaluation module adjusts the calculated Weighted Average Cost of Capital (WACC) to reflect a retirement liability.

11. The computer-based system for automated performance evaluation of an organization of claim 1 further comprising a competitor model for calculating a competitor's total return to shareholders.

12. The computer-based system for automated performance evaluation of an organization of claim 11 further comprising a graphing model, said graphing model preparing a visual comparison of said organizations' return to shareholders and said competitor's total return to shareholders.

13. The computer-based system for automated performance evaluation of an organization of claim 1 further comprising a lever strength analysis module, said lever strength analysis module calculating a change in shareholder return from modifying one or more entries in said financial information, whereby:
said equity return evaluation module receives the modified financial information and calculates a second return on invested capital;
said investment costs module receives the modified financial information and calculates a second weighted average cost of capital;
said growth estimation module receives the modified financial information and calculates a second total growth comprising a second organic growth and a second mergers and acquisitions growth;
said economic performance calculation module calculates a second total return to shareholders using the second calculated return on invested capital, the second calculated weighted average cost of capital, and second calculated total growth; and
said lever strength analysis module comparing said first and said second total returns to shareholders.

14. The computer-based system for automated performance evaluation of an organization of claim 1, wherein the level strength analysis module predicts a financial change associated with the at least one business action.

15. The computer-based system for automated performance evaluation of an organization of claim 13, whereby said lever strength analysis module calculates changes in shareholder return from modifying multiple entries in said financial information; and said lever strength analysis module identifying one or more of said modified entries causing a desired change in shareholder return.

16. The computer-based system for automated performance evaluation of an organization of claim 15, wherein the lever strength analysis module further proposes actions to achieve said identified modified entries.

17. The computer-based system for automated performance evaluation of an organization of claim 1 further comprising a competitor lever strength analysis module that calculates a change in a competitor's shareholder return from a financial change similar to the at least one identified financial change.

18. The computer-based system for automated performance evaluation of an organization of claim 1 further comprising a lever strength graphical display module that graphically displays said changes in the organization's and competitor's shareholders returns.

19. A computer-implemented method for automated performance evaluation of an organization, the method comprising the steps of:
a computer accessing remotely stored financial information;
said computer storing said financial information;
said computer calculating a return on invested capital using said stored financial information
said computer determining a β value of the organization by (1) identifying comparable businesses that operate in the same field as the organization, (2) determining the β values of the comparable businesses, (3) averaging the β values of the comparable businesses to determine an unlevered β value, (4) estimating an effect of the financing structure of the organization using the unlevered β value, and (5) determining a relevered β value for the organization by adding in the effect of the financing structure;
said computer calculating a weighted average cost of capital (WACC) using said stored financial information and said β value of the organization;
said computer calculating a total growth using said stored financial information, said total growth comprising an organic growth and a mergers and acquisitions growth;
said computer calculating a total return to shareholders using the calculated return on invested capital, the calculated weighted average cost of capital, and the total growth;
said computer identifying at least one financial change to the organization that would improve the total return to shareholders; and
said computer identifying at least one business action by the organization that would cause the at least one identified financial change.

20. The computer-implemented method for automated performance evaluation of an organization of claim 19, wherein the step of calculating a return on invested capital comprises calculating an operating margin, calculating a capital utilization, and multiplying the operating margin and the capital utilization.

21. The computer-implemented method for automated performance evaluation of an organization of claim 20, wherein the step of calculating the return on invested capital (ROIC) comprises using the following equation:

$$ROIC = \frac{NOPLAT}{Invested\ Capital}, \text{ where}$$

NOPLAT (net operating profit less adjusted taxes to financial capital contributors) is total operating profits with adjustments for taxes, and Invested Capital represents investor-provided capital.

22. The computer-implemented method for automated performance evaluation of an organization of claim 21, wherein the step of calculating the return on invested capital (ROIC) further comprises determining NOPLAT using the following equation:

$$NOPLAT = EBITA - Cash\ Taxes$$

where EBITA (Earnings Before Interest, Taxes, and Amortization) is calculated by determining revenue and adjusting for costs.

23. The computer-implemented method for automated performance evaluation of an organization of claim 19, wherein the step of calculating the Weighted Average Cost of Capital (WACC) comprises determining a weighted sum of costs of debt holders and costs of equity holders.

24. The computer-implemented method for automated performance evaluation of an organization of claim 23, wherein the step of calculating the Weighted Average Cost of Capital (WACC) comprises using the following equation:

$$WACC = K_d*(1-t)*D/(D+E) + K_e*E/(D+E)$$

where $K_d$ is a cost of debt, t is a tax rate on the debt,

D is a market value of the debt,

E is a market value of the equity, $K_e$ is a cost of equity, and

E/(D+E), a ratio of a value of equity to a value of the total debt and equity is a weighting factor for the cost of equity.

25. The computer-implemented method for automated performance evaluation of an organization of claim 24, wherein the step of calculating the Weighted Average Cost of Capital (WACC) further comprises calculating the cost of equity, $K_e$, using the following equation:

$$K_e = r_f + (r_m - r_f)*\beta, \text{ where:}$$

$r_f$ is a risk-free rate of return available to investors;

$r_m$ is a historic market risk premium; and

β is a factor that returns differ from the returns of a market portfolio.

26. The computer-implemented method for automated performance evaluation of an organization of claim 25, wherein the step of calculating the Weighted Average Cost of Capital (WACC) further comprises calculating the β value using the following equation:

$$\beta_U = \frac{\beta_L}{\left[1 + (1 - T_c) * \frac{D}{E}\right]})$$

where: $\beta_u$=beta without leverage;

$\beta_L$=beta with leverage;

$T_c$=the corporate marginal tax rate; and

D/E=the debt-to-equity ratio based on market values.

27. The computer-implemented method for automated performance evaluation of an organization of claim 19, wherein the step of calculating the Weighted Average Cost of Capital (WACC) further comprises adjusting to reflect an equipment lease.

28. The computer-implemented method for automated performance evaluation of an organization of claim 19, wherein the step of calculating the Weighted Average Cost of Capital (WACC) further comprises adjusting to reflect a retirement liability.

29. The computer-implemented method for automated performance evaluation of an organization of claim 19 further comprising the step of calculating a competitor's total return to shareholders.

30. The computer-implemented method for automated performance evaluation of an organization of claim 29 further comprising a step of preparing a visual comparison of said organizations' return to shareholders and said competitor's total return to shareholders.

31. The computer-implemented method for automated performance evaluation of an organization of claim 19 further comprising the steps of:

said computer creating a set of modified financial information;

said computer calculating a second return on invested capital using said modified financial information;

said computer calculating a second weighted average cost of capital (WACC) using said modified financial information;

said computer calculating a second total growth using said modified financial information, said second total growth comprising a second organic growth and a second mergers and acquisitions (M&A) growth; and said computer calculating a second total return to shareholders using the second calculated return on invested capital, the second calculated weighted average cost of capital, and second first total growth;

said computer comparing said first and said second total returns to shareholders.

32. The computer-implemented method for automated performance evaluation of an organization of claim 19, wherein the lever strength analysis module predicts a financial change associated with the at least one business action.

33. The computer-implemented method for automated performance evaluation of an organization of claim 19, whereby said computer calculates changes in shareholder return from modifying multiple entries in said financial information; and said computer identifies one or more of said modified entries causing a desired change in shareholder return.

34. The computer-implemented method for automated performance evaluation of an organization of claim 33, wherein the computer further proposes actions to achieve said identified modified entries.

35. The computer-implemented method for automated performance evaluation of an organization of claim 19 further comprising a step of calculating a change in a competitor's shareholder return from a financial change similar to the at least one identified financial change.

36. The computer-implemented method for automated performance evaluation of an organization of claim 35 further comprising graphically displaying said changes in the organization's and competitor's shareholders returns.

37. A computer-readable storage medium containing a set of instructions for evaluating performance of an organization, the set of instructions when executed by a computer implement a process comprising:
  accessing financial information on the organization;
  storing said accessed financial information;
  calculating a return on invested capital using said stored financial information;
  determining a β value of the organization by (1) identifying comparable businesses that operate in the same field as the organization, (2) determining the β values of the comparable businesses, (3) averaging the β values of the comparable businesses to determine an unlevered β value, (4) estimating an effect of the financing structure of the organization using the unlevered β value, and (5) determining a relevered β value for the organization by adding in the effect of the financing structure;
  calculating a weighted average cost of capital using said stored financial information and said β value of the organization;
  calculating total growth using said stored financial information, said total growth comprising organic growth and mergers and acquisitions growth;
  calculating a total return to shareholders using the return on invested capital, the weighted average cost of capital, and the total growth;
  identifying at least one financial change to the organization that would improve the total return to shareholders; and
  identifying at least one business action by the organization that would cause the at least one identified financial change.

38. The computer-readable storage medium of claim 37 wherein the process implemented by the set of instructions further comprises:
  calculating a competitor's total return to shareholders; and
  preparing a visual comparison of said organizations' return to shareholders and said competitor's total return to shareholders.

* * * * *

UNITED STATES PATENT AND TRADEMARK OFFICE
CERTIFICATE OF CORRECTION

| | | |
|---|---|---|
| PATENT NO. | : 7,912,769 B2 | Page 1 of 1 |
| APPLICATION NO. | : 10/903488 | |
| DATED | : March 22, 2011 | |
| INVENTOR(S) | : Michael Kirk Ostergard | |

It is certified that error appears in the above-identified patent and that said Letters Patent is hereby corrected as shown below:

Title page, item 57 (abstract), line 1, "provide and system" should read --provide a system--.

Title page, item 57 (abstract), line 8, "Mergers" should read --mergers--.

Signed and Sealed this
Twenty-fourth Day of May, 2011

David J. Kappos
*Director of the United States Patent and Trademark Office*